US012572532B2

(12) United States Patent
Pollick et al.

(10) Patent No.: US 12,572,532 B2
(45) Date of Patent: Mar. 10, 2026

(54) TECHNIQUES FOR ONTOLOGY QUERY CONSTRUCTION

(71) Applicant: PassiveLogic, Inc., Holladay, UT (US)

(72) Inventors: Tyler Pollick, Salt Lake City, UT (US); Sarah Schuster-Johnson, Salt Lake City, UT (US); Colton Hyer, Salt Lake City, UT (US); Nikki Rae, Grantham (GB)

(73) Assignee: PassiveLogic, Inc., Holladay, UT (US)

( * ) Notice: Subject to any disclaimer, the term of this patent is extended or adjusted under 35 U.S.C. 154(b) by 23 days.

(21) Appl. No.: 18/498,478

(22) Filed: Oct. 31, 2023

(65) Prior Publication Data

US 2025/0139084 A1      May 1, 2025

(51) Int. Cl.
| | |
|---|---|
| *G06F 16/00* | (2019.01) |
| *G06F 16/242* | (2019.01) |
| *G06F 16/2453* | (2019.01) |
| *G06F 16/2455* | (2019.01) |
| *G06F 16/248* | (2019.01) |
| *G06F 16/36* | (2019.01) |

(52) U.S. Cl.
CPC ...... *G06F 16/2428* (2019.01); *G06F 16/2453* (2019.01); *G06F 16/2455* (2019.01); *G06F 16/248* (2019.01); *G06F 16/367* (2019.01)

(58) Field of Classification Search
CPC .............. G06F 16/2428; G06F 16/367; G06F 16/2455; G06F 16/2453; G06F 16/248
See application file for complete search history.

(56) References Cited

U.S. PATENT DOCUMENTS

| | | | | |
|---|---|---|---|---|
| 7,039,647 | B2 * | 5/2006 | Lowe ................... | G06F 16/3322 |
| | | | | 707/999.102 |
| 10,558,666 | B2 * | 2/2020 | Huddleston ......... | G06F 16/3331 |
| 2004/0103090 | A1 * | 5/2004 | Dogl ..................... | G06F 16/338 |
| 2006/0155694 | A1 * | 7/2006 | Chowdhury .......... | G06F 16/954 |
| 2015/0234822 | A1 * | 8/2015 | Gargalhone ...... | G06F 16/24522 |
| | | | | 707/728 |
| 2015/0269262 | A1 * | 9/2015 | Kumar ................ | G06F 16/3338 |
| | | | | 707/710 |
| 2018/0276293 | A1 * | 9/2018 | Rozsa ..................... | G06F 40/30 |
| 2020/0125602 | A1 * | 4/2020 | Sezgin ................ | G06F 16/2393 |
| 2020/0226156 | A1 * | 7/2020 | Borra .................... | G06F 16/212 |
| 2021/0165815 | A1 * | 6/2021 | Dimov .................. | G06F 16/367 |
| 2022/0156299 | A1 * | 5/2022 | Kervin ................ | G06F 16/9024 |
| 2024/0061894 | A1 * | 2/2024 | Hong ..................... | G06F 40/242 |
| 2024/0354322 | A1 * | 10/2024 | Mukherjee .......... | G06F 16/3344 |

* cited by examiner

*Primary Examiner* — Cheryl Lewis

(57) ABSTRACT

Apparatuses, methods, program products, and systems are disclosed for techniques for ontology query construction. An apparatus includes a processor and a memory that stores code that is executable by the processor. The code is executable by the processor to receive a starting model associated with a graph schema defining a graph, receive an ending model associated with the graph schema, determine an optimal path through the graph schema from the starting model to the ending model, and construct a query for querying the graph based on the determined optimal path.

20 Claims, 12 Drawing Sheets

100

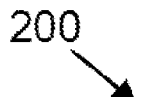
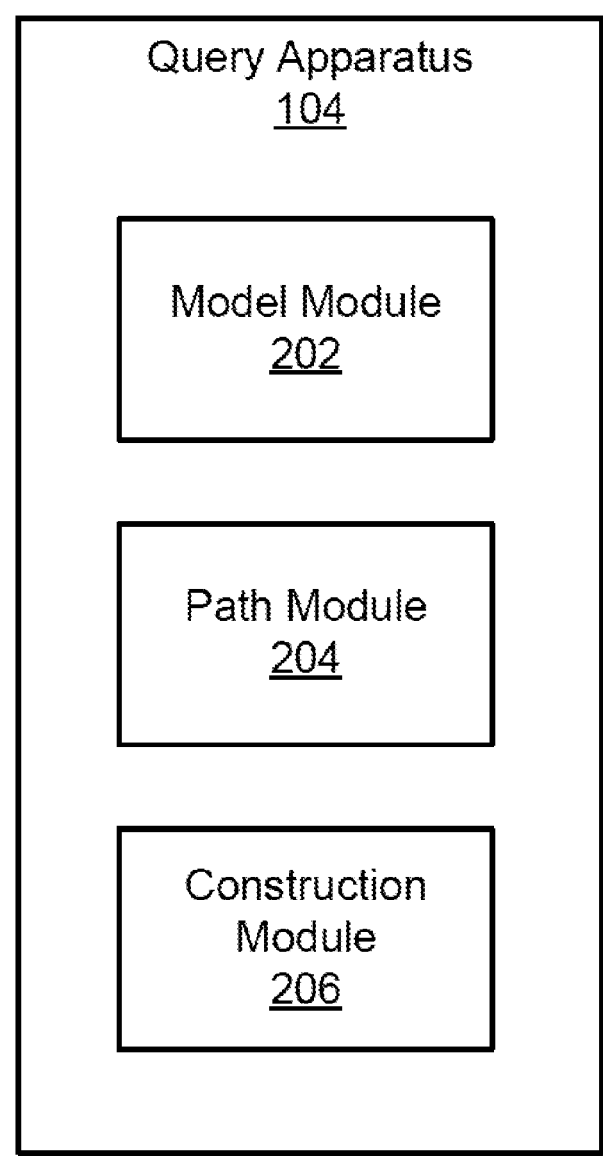
FIG. 2

300

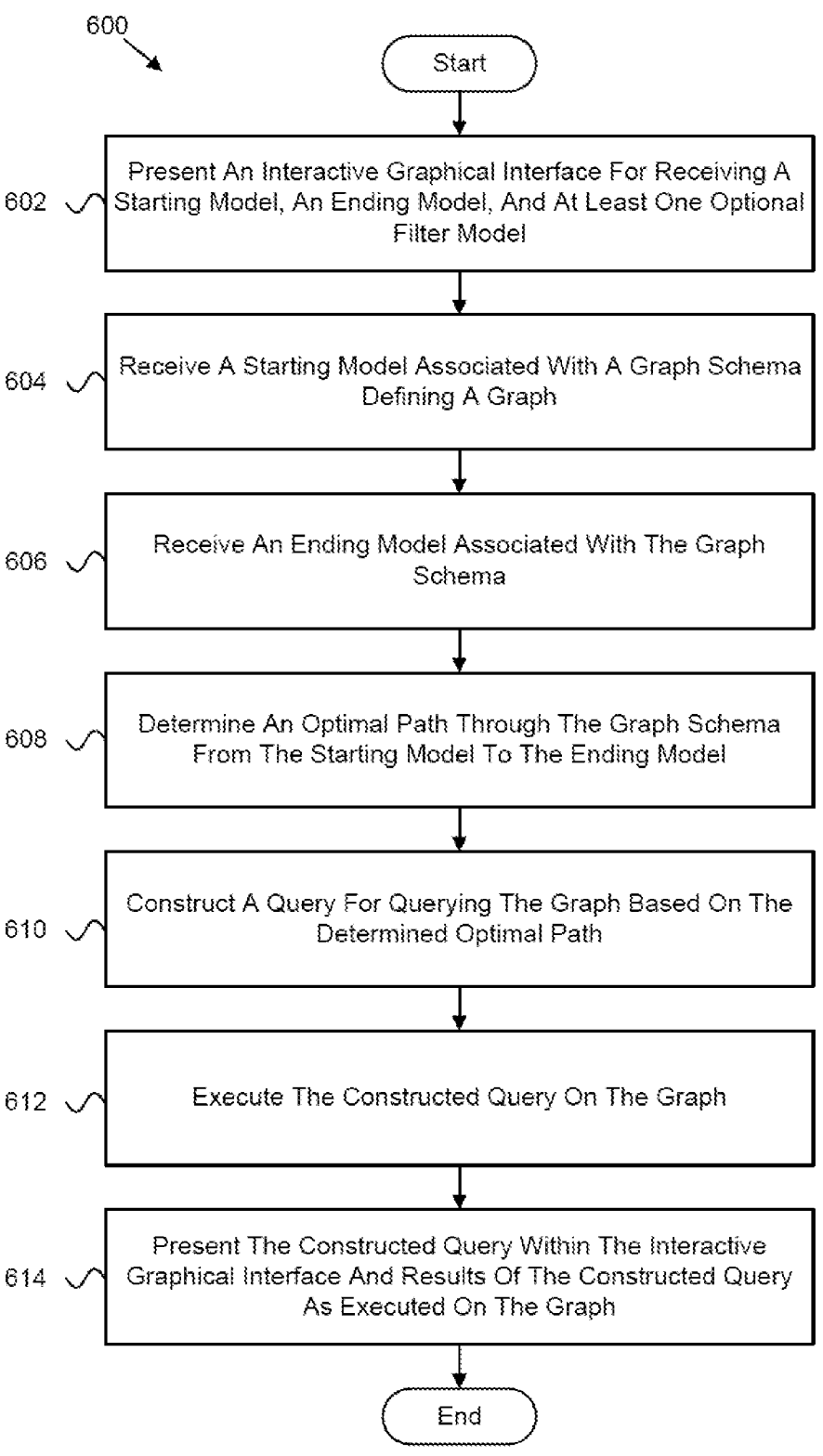

600

Start

602 — Present An Interactive Graphical Interface For Receiving A Starting Model, An Ending Model, And At Least One Optional Filter Model 604 — Receive A Starting Model Associated With A Graph Schema Defining A Graph 606 — Receive An Ending Model Associated With The Graph Schema 608 — Determine An Optimal Path Through The Graph Schema From The Starting Model To The Ending Model 610 — Construct A Query For Querying The Graph Based On The Determined Optimal Path 612 — Execute The Constructed Query On The Graph 614 — Present The Constructed Query Within The Interactive Graphical Interface And Results Of The Constructed Query As Executed On The Graph End

TECHNIQUES FOR ONTOLOGY QUERY CONSTRUCTION

FIELD

The subject matter disclosed herein relates to computing and more particularly relates to techniques for ontology query construction.

BACKGROUND

Data structures can become complex and sophisticated over time. Different languages are used to query a data structure to identify data within the structure without requiring the user to manually search the data structure.

BRIEF SUMMARY

An apparatus for techniques for ontology query construction is disclosed. A method and system also perform the functions of the apparatus. In one embodiment, an apparatus includes a processor and a memory that stores code that is executable by the processor. In one embodiment, the code is executable by the processor to receive a starting model associated with a graph schema defining a graph, receive an ending model associated with the graph schema, determine an optimal path through the graph schema from the starting model to the ending model, and construct a query for querying the graph based on the determined optimal path.

In one embodiment, a method for techniques for ontology query construction receiving a starting model associated with a graph schema defining a graph, receiving an ending model associated with the graph schema, determining an optimal path through the graph schema from the starting model to the ending model, and constructing a query for querying the graph based on the determined optimal path.

In one embodiment, an apparatus for techniques for ontology query construction includes means for receiving a starting model associated with a graph schema defining a graph, means for receiving an ending model associated with the graph schema, means for determining an optimal path through the graph schema from the starting model to the ending model, and means for constructing a query for querying the graph based on the determined optimal path.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a schematic block diagram illustrating one embodiment of an apparatus for techniques for ontology query construction in accordance with the subject matter disclosed herein;

FIG. 6 is a schematic flow chart diagram illustrating one embodiment of another method for techniques for ontology query construction in accordance with the subject matter disclosed herein;

DETAILED DESCRIPTION

Figure 1:
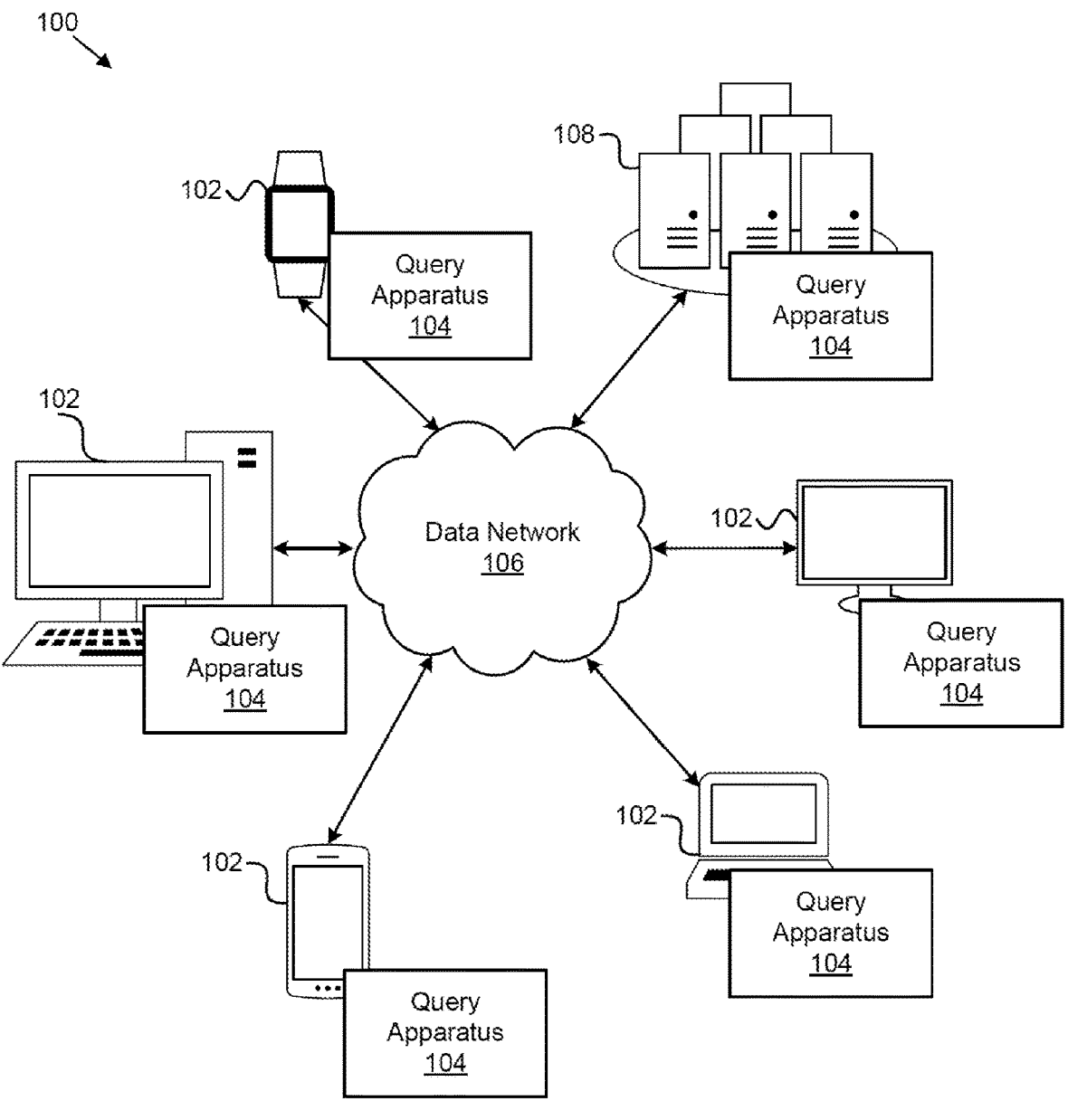
FIG. 1 is a schematic block diagram illustrating one embodiment of a system for techniques for ontology query construction in accordance with the subject matter disclosed herein.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like. Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable mediums may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, a apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In one embodiment, an apparatus includes a processor and a memory that stores code that is executable by the processor. In one embodiment, the code is executable by the processor to receive a starting model associated with a graph schema defining a graph, receive an ending model associated with the graph schema, determine an optimal path through the graph schema from the starting model to the ending model, and construct a query for querying the graph based on the determined optimal path.

In one embodiment, the code is executable by the processor to execute the constructed query on the graph and present results of the executed query. In one embodiment, the code is executable by the processor to present the results of the executed query as a graph structure.

In one embodiment, the code is executable by the processor to receive at least one filter model for setting a condition for the determined optimal path. In one embodiment, the code is executable by the processor to present an interactive graphical interface for receiving the starting model, the ending model, and at least one optional filter model.

In one embodiment, the code is executable by the processor to present a plurality of models associated with the graph schema and receive a selection of the starting model, the ending model, and the at least one optional filter model in response to user input. In one embodiment, the user input comprises a drag-and-drop action.

In one embodiment, the code is executable by the processor to receive a user-defined value for the at least one optional filter model via the interactive graphical interface. In one embodiment, the code is executable by the processor to present the constructed query within the interactive graphical interface and results of the constructed query as executed on the graph.

In one embodiment, the code is executable by the processor to, in response to a plurality of filter models being selected, receive a selection of at least one Boolean operator to apply to at least two of the selected filter models. In one embodiment, the code is executable by the processor to perform a breadth-first search to determine the optimal path through the graph schema from the starting model to the ending model.

In one embodiment, the code is executable by the processor to determine the optimal path based on weights associated with the models defined in the graph schema. In one embodiment, the code is executable by the processor to determine the optimal path based on inferences determined according to the starting model, the ending model, at least one optional filter model, user input, or a combination thereof.

In one embodiment, the code is executable by the processor to determine a plurality of paths through the graph schema from the starting model to the ending model and select the optimal path from the plurality of paths. In one embodiment, the optimal path comprises a shortest path from the starting model to the ending model.

In one embodiment, the code is executable by the processor to determine the optimal path and construct the query in real-time in response to updates associated with the starting model, the ending model, at least one optional filter model, user input, or a combination thereof. In one embodiment, the graph schema is associated with a building ontology, the building ontology defining different elements of a building system.

In one embodiment, a method for techniques for ontology query construction receiving a starting model associated with a graph schema defining a graph, receiving an ending model associated with the graph schema, determining an optimal path through the graph schema from the starting model to the ending model, and constructing a query for querying the graph based on the determined optimal path.

In one embodiment, an apparatus for techniques for ontology query construction includes means for receiving a starting model associated with a graph schema defining a graph, means for receiving an ending model associated with the graph schema, means for determining an optimal path through the graph schema from the starting model to the ending model, and means for constructing a query for querying the graph based on the determined optimal path.

FIG. 1 is a schematic block diagram illustrating one embodiment of a system for techniques for ontology query construction. In one embodiment, the system 100 includes one or more information handling devices 102, one or more query apparatuses 104, one or more data networks 106, and one or more servers 108. In certain embodiments, even though a specific number of information handling devices 102, query apparatuses 104, data networks 106, and servers 108 are depicted in FIG. 1, one of skill in the art will recognize, in light of this disclosure, that any number of information handling devices 102, query apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a micro-controller, and/or another semiconductor integrated circuit device), a volatile memory, and/or a non-volatile storage medium, a display, a connection to a display, and/or the like.

In general, in one embodiment, the query apparatus 104 is configured to dynamically generate graph queries for determining a path from a starting point to an ending point of a complex ontological structure, which may be represented as a graph. As used herein, an ontology generally refers to a way of showing the properties of a subject area and how they are related, by defining a set of terms and relational expressions that represent the entities in that subject area. In a more practical example, as discussed herein, an ontology may represent a structure such as a building and the various elements/components of the building, e.g., the floors, the rooms, the doors, the windows, the heating, ventilation, and air conditioning (HVAC) components, or the like. A graph, as used herein, may be a data structure that represents complex, non-linear relationships between objects, consisting of edges and nodes/vertices.

An issue with complex ontologies, however, is the comprehension and interpretation of data within a sophisticated ontological structure. This challenge is amplified when attempting to introduce a paradigm shift in the understanding of complex ontologies, such as buildings, and the seamless integration of familiar interfaces and tools, e.g., graphQL. Moreover, the restricted accessibility of query languages to experienced users creates formidable barriers that hinder individuals seeking to leverage the advantages of these operations.

The query apparatus 104, in one embodiment, simplifies the construction of graph queries by breaking them down into manageable sections, which are then seamlessly transformed into the desired query format. By leveraging a graph visualization of the ontology, the query apparatus 104 facilitates the population of query components and encourages users to generate meaningful queries. Employing breadth-first search and inferencing techniques, the generated query maximizes desirability and effectiveness. Additionally, users can effortlessly chain multiple queries to efficiently expand their query results as needed, enabling enhanced query capabilities and improved efficiency.

In one embodiment, the query apparatus 104 receives a starting model and an ending model associated with a graph schema that defines a graph. The query apparatus 104, in one embodiment, determines an optimal path through the graph schema from the starting model to the ending model and constructs a query for querying the graph based on the determined optimal path. The query apparatus 104 is described in more detail below with reference to FIG. 2.

In certain embodiments, the query apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the query apparatus 104 may include a power interface, a wired and/or wireless network interface, a graphical interface that attaches to a display, and/or a semiconductor integrated circuit device as described below, configured to perform the functions described herein with regard to the query apparatus 104.

The query apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a micro-controller, an application-specific integrated circuit ("ASIC"), a processor, a processor core, or the like. In one embodiment, the query apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the query apparatus 104.

The semiconductor integrated circuit device or other hardware appliance of the query apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the query apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network.

The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to execute or run machine learning algorithms, programs, applications, processes, and/or the like; communicate with a thermal imaging device; store thermal imaging data in a database, blockchain, or other secure data structure; and/or the like.

FIG. 2 is a schematic block diagram illustrating one embodiment of an apparatus 200 for techniques for ontology query construction. In one embodiment, the apparatus 200 includes an instance of a query apparatus 104. In one embodiment, the query apparatus 104 includes one or more of a model module 202, a path module 204, and a construction module 206, which are described in more detail below.

In one embodiment, the model module 202 is configured to receive at least a starting model and an ending model associated with a graph schema defining a graph. As used herein, a model may refer to a data structure, object, entity, or the like that represents a node/vertex in the graph, and may include metadata, attributes, relationships, and/or other information describing the node/vertex. Further, in one embodiment, the graph schema is associated with a building ontology, the building ontology defining different elements of a building system. Thus, as it relates to a building ontology, a model may represent a building, a floor, a room, a piece of equipment (e.g., HVAC equipment), a window, a door, a fire extinguisher, a smoke alarm, and/or the like. In general, a model may represent an object, element, component, or the like that is represented in the graph and defined in the graph schema.

In one embodiment, the model module 202 is configured to receive at least one filter model for setting a condition for the determined optimal path. A filter model, as used herein, may include a condition, criterion, setting, parameter, variable, value, range, setting, or the like that that narrows or constrains the search for an optimal path through the graph schema (as described below). For instance, the filter model may include a criterion that specifies that the optimal path should only include rooms within a building that have a window, or floors that include HVAC equipment for a specific manufacturer, or the like. Other criteria may include a weight threshold or range of weights, a number of hops or nodes between the starting model and the ending model, or the like.

In one embodiment, the path module 204 is configured to determine an optimal path through the graph schema from the starting model to the ending model. As used herein, an optimal path may be a shortest path from the starting model to the ending model, may be a shortest path based on the criterion set in the filter model, may be a path with the lowest or the highest weight, may be a path that includes selected nodes/models (e.g., user-defined nodes/models), and/or the like. The path module 204 may define a path as the nodes/models and the edges that are located between the starting model and the ending model.

In one embodiment, the path module 204 performs a breadth-first search to determine the optimal path through the graph schema from the starting model to the ending model. A breadth-first search, as used herein, may refer to an algorithm that is used to search a graph data structure for a node that meets a set of criteria. It starts at the root of the graph and visits all nodes at the current depth level before moving on to the nodes at the next depth level. Thus, as used herein, the path module 204 may perform a breadth-first search that begins at the starting model and traverses the graph until it reaches the ending model (given the constraints, if any, of the filter model).

In one embodiment, the path module 204 determines the optimal path based on weights associated with the models defined in the graph schema. In one embodiment, different nodes or edges between nodes in the graph may include weights that specify a priority or importance of a node or edge, e.g., a weighted graph. The path module 204 may identify, determine, receive, or the like, a total weight, a threshold weight, a desired weight, a range of weights, or the like (which may be specified in the filter model) that the path module 204 uses to determine the optimal path. The weight information may be user-defined, may be inferred from previous query construction or the graph structure, and/or the like.

In one embodiment, the path module 204 determines the optimal path based on inferences determined according to the starting model, the ending model, at least one optional filter model, user input, or a combination thereof. In one embodiment, the inferences may include a direction of the path, e.g., a user may specify that the starting model is a building, and the ending model is a floor, so paths that go from the floor to a building may be excluded. In another embodiment, the path module 204 may infer that certain paths should be excluded if the paths exceed a weight threshold, exceed a number of hops, exceed a path length, and/or the like.

In one embodiment, the path module 204 determines a plurality of paths through the graph schema from the starting model to the ending model and selects the optimal path from the plurality of paths. In such an embodiment, the path module 204 may run multiple threads, processes, or the like to determine, simultaneously, multiple different paths through the graph schema from the starting model to the ending model to determine the optimal path, which may include incorporation of at least a subset of criteria defined in the filter model, defined by a user, or the like; based on weighting thresholds; based on inferences (e.g., the direction of the path); and/or the like.

In one embodiment, the construction module 206 is configured to construct a query for querying the graph based on the determined optimal path. A query, as used herein, may refer to a request for information, e.g., from a data store or other location. The query may be structured in a text format, e.g., a query language such as SQL, GraphQL, or the like, or multiple different types of query languages. In such an embodiment, the construction module 206 may identify the nodes/models and the edges between the starting model and the ending model and may transform or translate the path into a structured query statement, which can then be run against the graph for getting additional information from the graph, e.g., node or edge metadata, or the like.

In one embodiment, the path module 204 determines the optimal path and constructs the query in real-time in response to updates associated with the starting model, the ending model, at least one optional filter model, user input, or a combination thereof. For instance, the path module 204 may reanalyze the graph to determine the optimal path based on a change in the starting model, the ending model, the filter model, or other input criteria. Moreover, if the path module 204 detects a change in the graph schema itself, the path module 204 may update existing queries to reflect the change in the graph structure.

Figure 3:
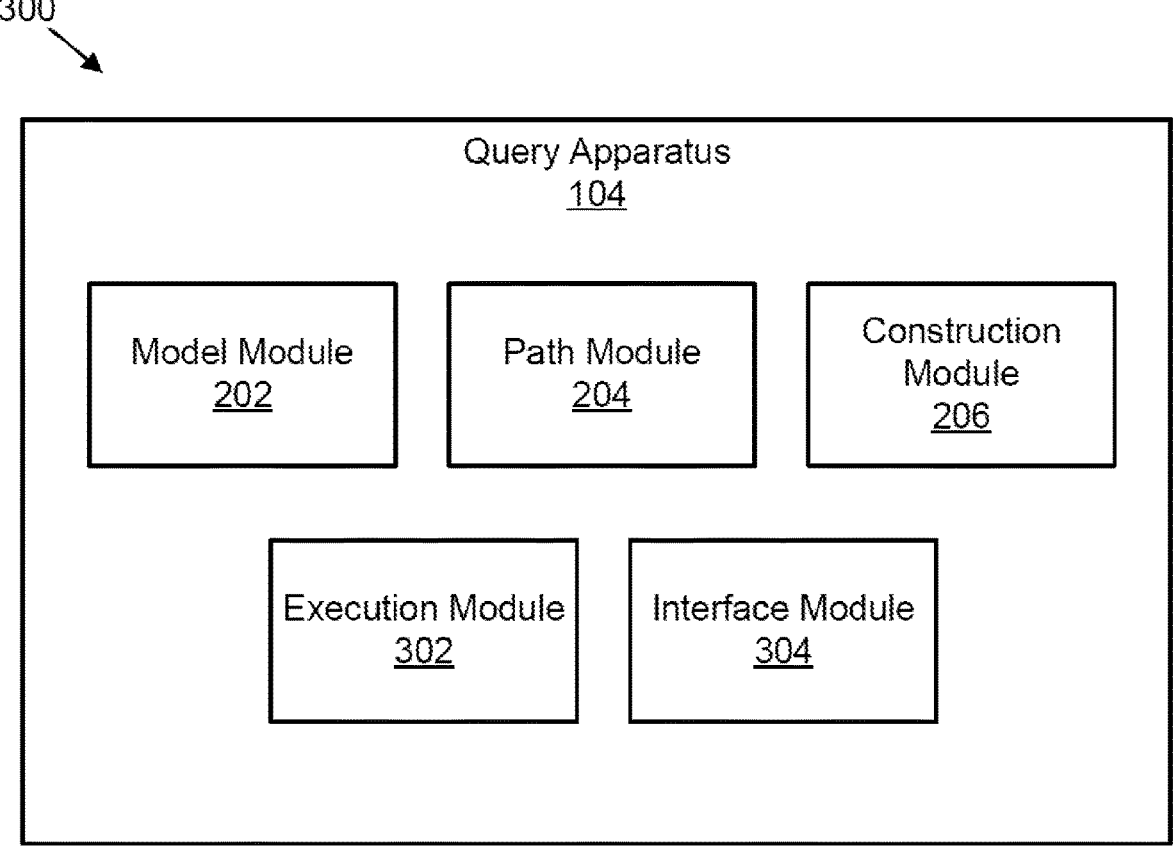
FIG. 3 is a schematic block diagram illustrating one embodiment of an apparatus for techniques for ontology query construction in accordance with the subject matter disclosed herein.

FIG. 3 is a schematic block diagram illustrating one embodiment of an apparatus 300 for techniques for ontology query construction. In one embodiment, the apparatus 300 includes an instance of a query apparatus 104. In one embodiment, the query apparatus 104 includes one or more of a model module 202, a path module 204, and a construction module 206, which may be substantially similar to the model module 202, path module 204, and construction module 206 described above. In one embodiment, the query apparatus 104 includes an execution module 302 and an interface module 304.

In one embodiment, the execution module 302 is configured to execute the constructed query on the graph and present results of the executed query. In such an embodiment, the execution module 302 takes the query that the construction module 206 generates and runs the query against the graph, e.g., using a query language system such as SQL, GraphQL, or the like. The execution module 302, in one embodiment, receives the results of the query, if any, and presents the results within a user interface, e.g., as a flat list, in a structured or marked-up (e.g., XML) format, as a graph structure, and/or the alike.

In one embodiment, if the path module 204 updates the optimal path, e.g., in response to a change in the starting or ending model, and the construction module 206 constructs a new query, the execution module 302 may execute the updated query in real time, to provide an up-to-date results in real time. In this manner, a user may change or modify the parameters and see the results in real time.

In one embodiment, the interface module 304 is configured to present an interactive graphical interface for receiving the starting model, the ending model, and at least one optional filter model. In such an embodiment, the interface module 304 presents a plurality of models (e.g., graphical representations of models) associated with the graph schema and receives a selection of the starting model, the ending model, and the at least one optional filter model in response to user input. The selection, in one embodiment, may include a drag-and-drop action, a tap action, a click action, or the like.

In one embodiment, the interface module 304 receives a user-defined value for the at least one optional filter model via the interactive graphical interface. The user-defined value may be a number, string, character, Boolean operator, or the like. In one embodiment, the interface module 304, in response to a plurality of filter models being selected, receives a selection of at least one Boolean operator to apply to at least two of the selected filter models. For example, if two different filter models, e.g., conditions, are selected to be part of the query, the user may select a Boolean operator such as AND, OR, or the like.

Figure 4A:
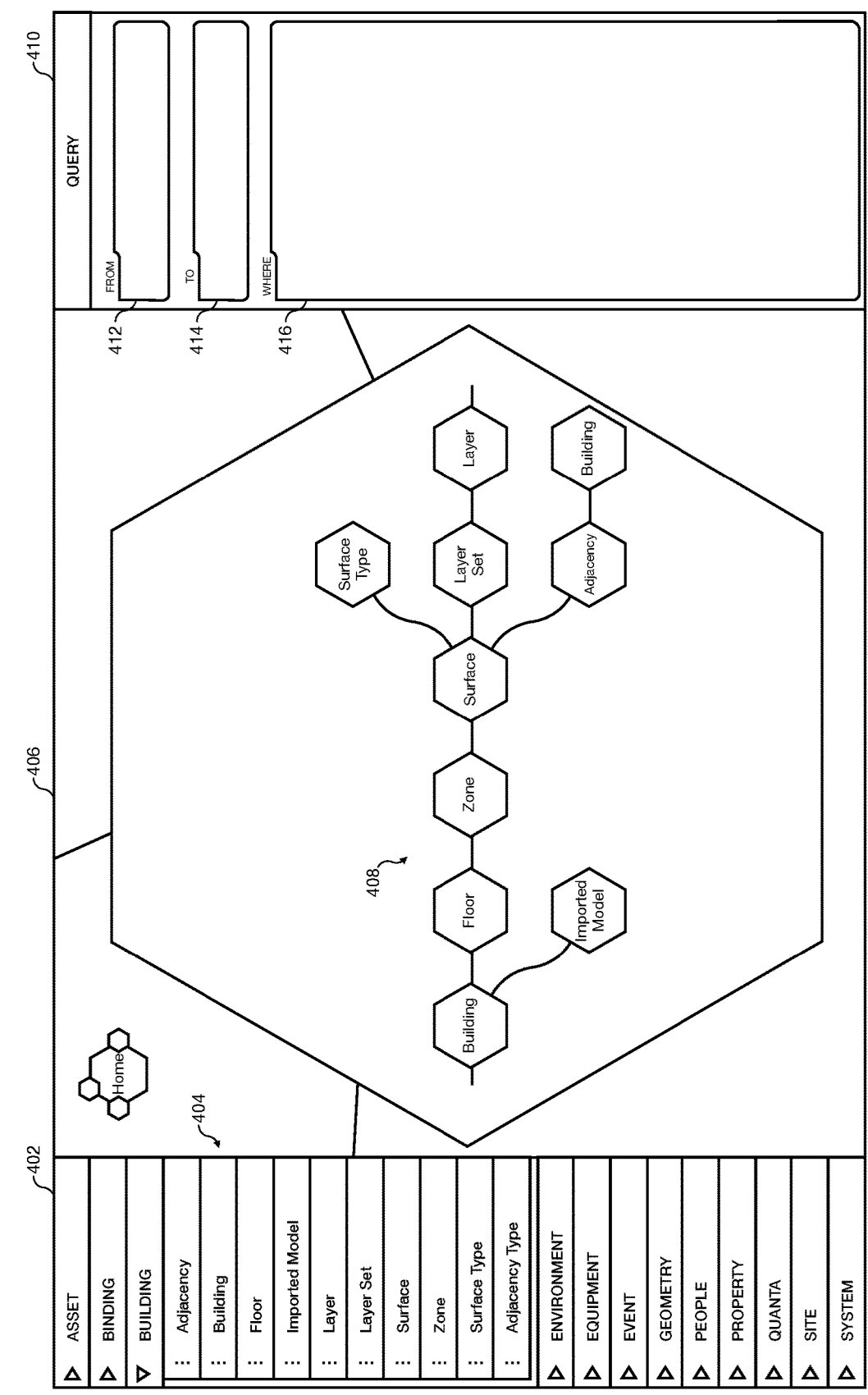
FIG. 4A is an example of an interface for techniques for ontology query W construction in accordance with the subject matter disclosed herein.

FIG. 4A depicts one embodiment of a graphical interface 400 for building a query that the interface module 304 may generate and present. In one embodiment, the graphical interface 400 includes a model pane 402 that includes a listing of different models 404, which may be grouped/organized by type, category, user preference, or the like. The graphical interface 400 may include a graph pane 406 for displaying at least a portion of a graph schema or structure, e.g., for the underlying ontology. In one embodiment, the graphical interface 400 includes a query pane 410 where the user can place models 404 from the model pane 402, e.g., via a drag and drop action. The query pane 410, in one embodiment, includes locations for placing the starting model 412, the ending model 414, and conditionals for the filter model 416.

Figure 4B:
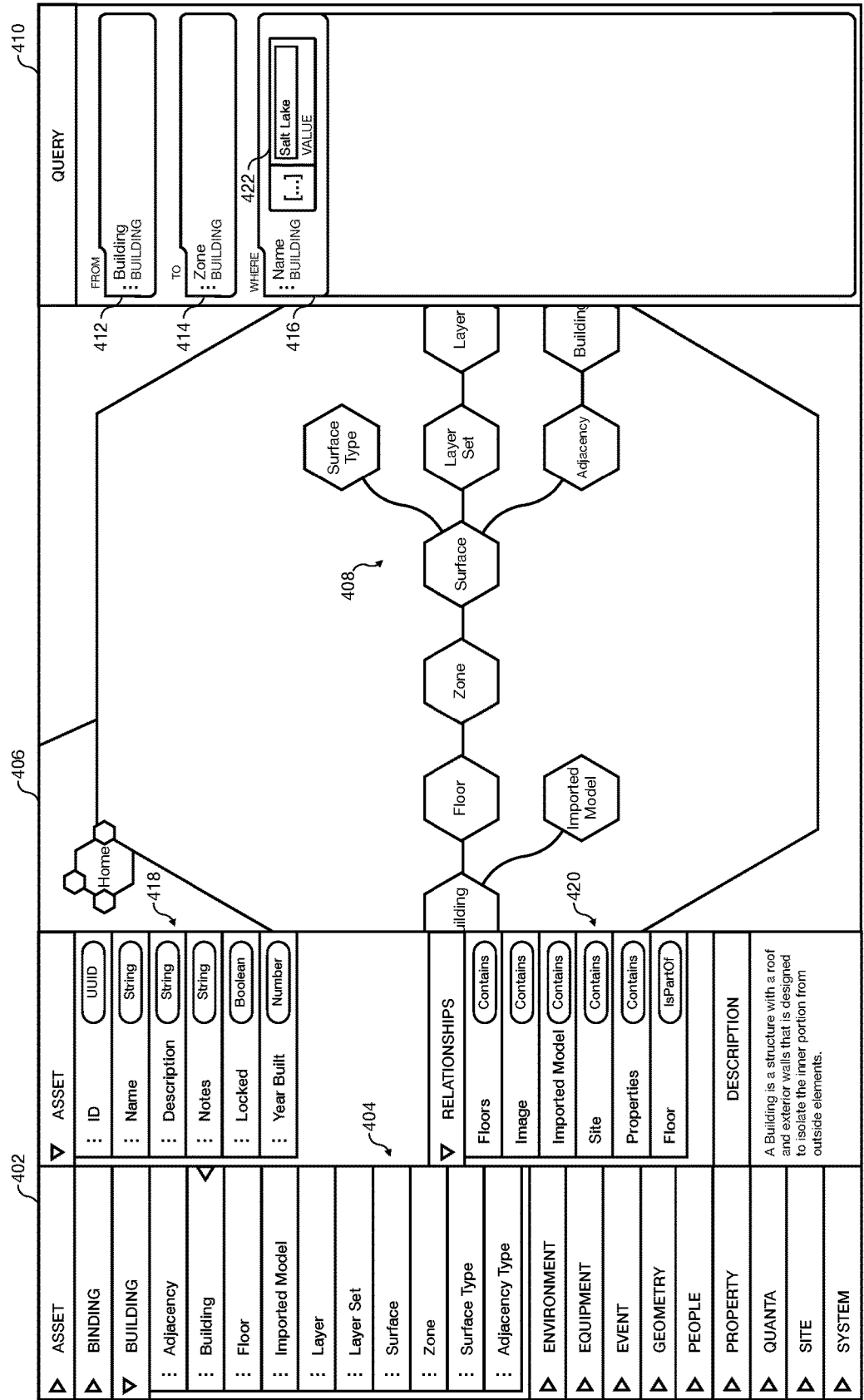
FIG. 4B is an example of an interface for techniques for ontology query construction in accordance with the subject matter disclosed herein.

FIG. 4B depicts one embodiment of a graphical interface 400 for building a query that the interface module 304 may generate and present. In the depicted embodiment, a user has dragged a starting model 412 ("Building") and an ending model ("Zone") 414 to the query pane 410. In one embodiment, in response to the user selecting a model 404 from the model pane 402, the interface module 304 may show additional characteristics, attributes 418, relationships 420, or the like for the selected model 404, which may be used to further refine the query in the query pane 410. Further, as shown in FIG. 4B, the user has dragged a condition or filter model 416 to the query pane 410. The filter model 416 that is shown allows a user to select the condition of the filter, e.g., it may include Boolean operators, free form text entry fields 422, and/or other fields where the user can specify values, ranges, or the like.

Once the user is satisfied, the user selects a button to run the query using the starting model 412, the ending model 414, and the filter model 416. In response to the user selecting the button to run the query, the model module 202 receives the starting model, 412, the ending model 414, and the filter model 416 (including the user-defined values), the path module 204 determines the optimal path 204 based on the inputted models 412-416, the construction module 206 constructs a query for the optimal path, and the execution module 208 executes the constructed query.

Figure 4C:
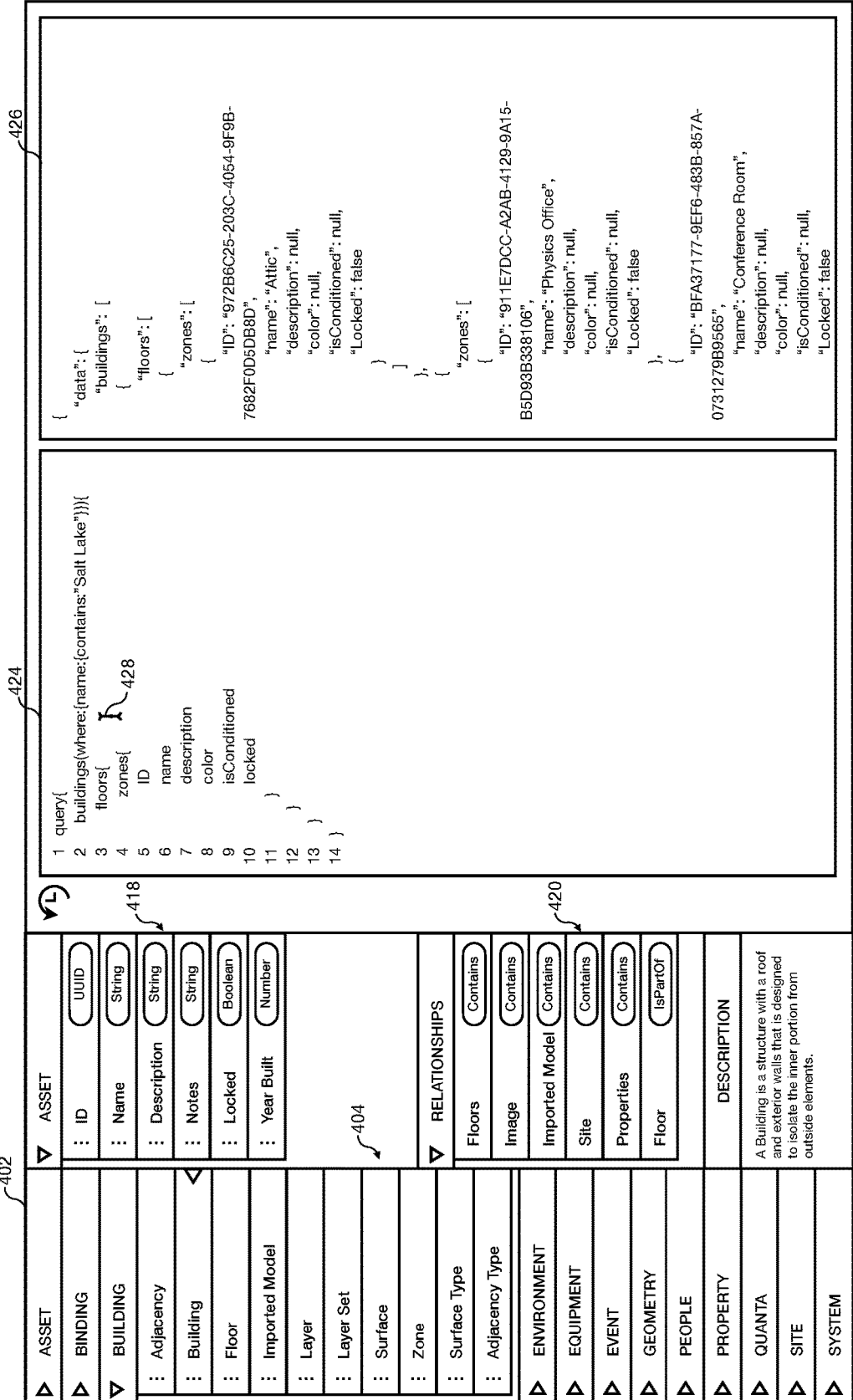
FIG. 4C is an example of an interface for techniques for ontology query construction in accordance with the subject matter disclosed herein.

FIG. 4C depicts one embodiment of the output or results of running the constructed query against the graph schema. In one embodiment, the results include a textual representation of the optimal path 424 and the corresponding meta-data, attributes, characteristics, or the like of the results of the query 426. It is noteworthy that in this example, the optimal path from "Building" to "Zone" includes a "Floors" model, which was not specified in the query pane 410, but was included because it is part of the optimal path for the graph schema. Thus, the query builder features of the subject matter herein allows a user to intuitively generate a query for a complex graph schema without requiring the user to be aware of all the parts or elements of the graph schema or be familiar with the query language that is used to query the graph schema. The user can quickly select a starting model, an ending model, and any filters/conditions that are desired, and the query apparatus 104 uses that information to determine the optimal path through the graph, generate the corresponding query, run the query, and display the results.

Figure 5:
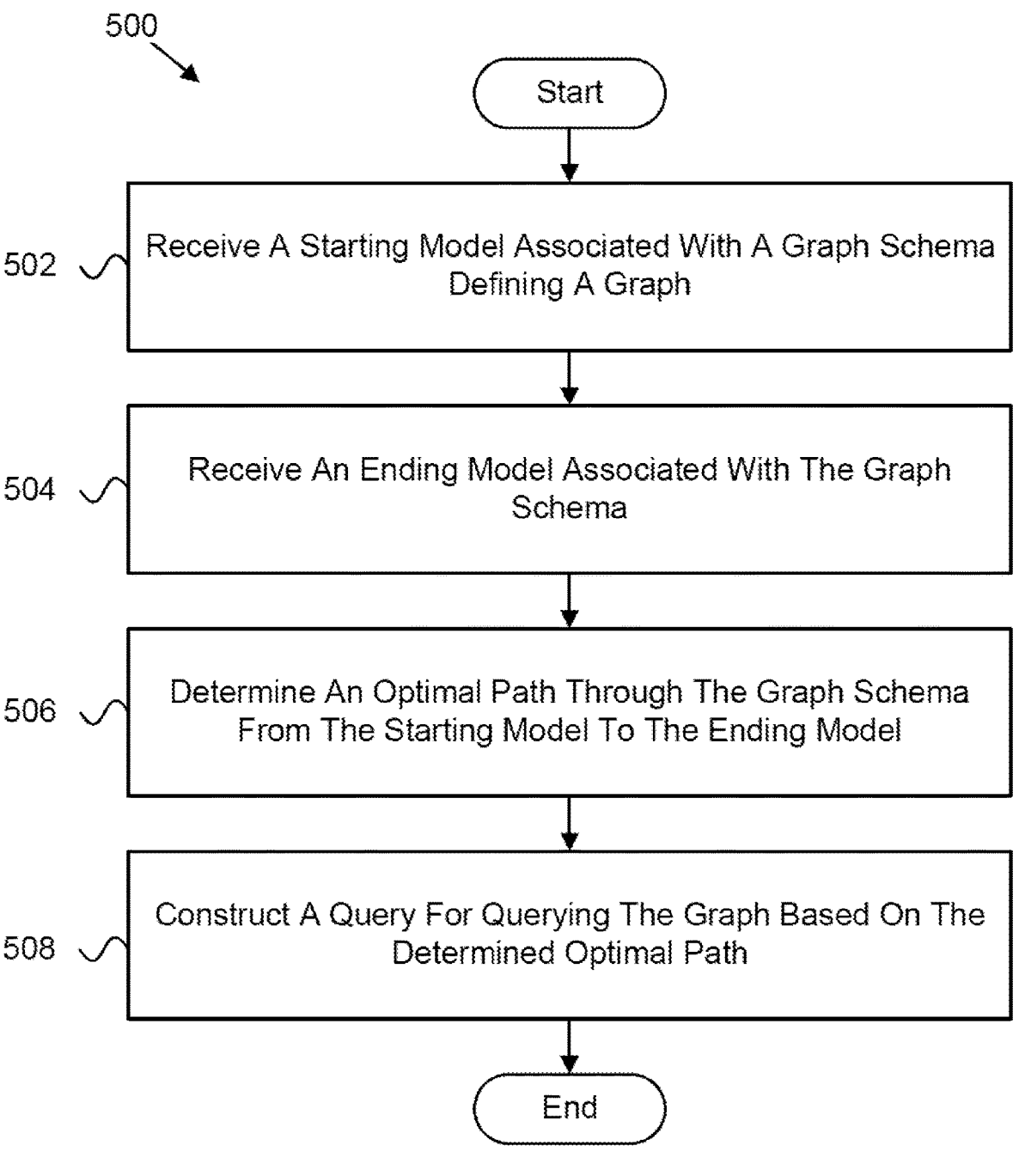
FIG. 5 is a schematic flow chart diagram illustrating one embodiment of a method for techniques for ontology query construction in accordance with the subject matter disclosed herein.

FIG. 5 depicts one embodiment of a method 500 for techniques for ontology query construction. In one embodiment, the method 500 is performed by an information handling device 102, a query apparatus 104, a model module 202, a path module 204, a construction module 206, an execution module 208, and/or an interface module 210. In one embodiment, the method 500 begins and receives 502 a starting model associated with a graph schema defining a graph, receives 504 an ending model associated with the graph schema, determines 506 an optimal path through the graph schema from the starting model to the ending model, and constructs 508 a query for querying the graph based on the determined optimal path, and the method 500 ends.

FIG. 6 depicts one embodiment of a method 600 for techniques for ontology query construction. In one embodiment, the method 600 is performed by an information handling device 102, a query apparatus 104, a model module 202, a path module 204, a construction module 206, an execution module 208, and/or an interface module 210.

In one embodiment, the method 600 begins and presents 602 an interactive graphical interface for receiving a starting model, an ending model, and at least one optional filter model. In one embodiment, the method 600 receives 604 the starting model associated with a graph schema defining a graph and receives 606 the ending model associated with the graph schema from the graphical interface.

In one embodiment, the method 600 determines 608 an optimal path through the graph schema from the starting model to the ending model and constructs 610 a query for querying the graph based on the determined optimal path. In one embodiment, the method 600 executes 612 the constructed query on the graph and presents 614 the constructed query within the interactive graphical interface and the results of the constructed query as executed on the graph, and the method 600 ends.

Means for performing the steps described herein, in various embodiments, may include one or more of an information handling device 102, a server 108, a query apparatus 104, a model module 202, a path module 204, a construction module 206, an execution module 302, an interface module 304, a mobile application, a network interface, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing the steps described herein.

Figure 7:
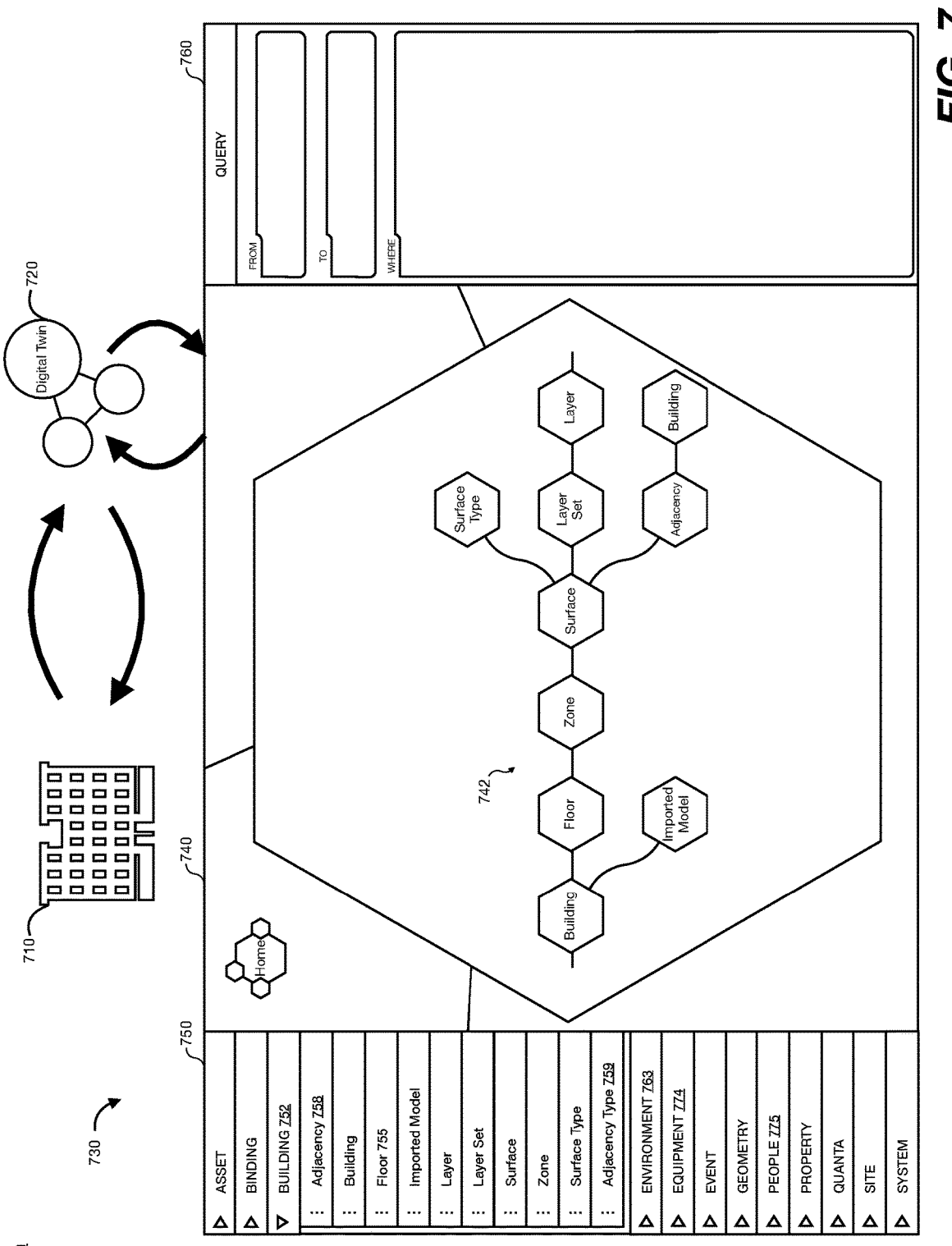
FIG. 7 is an example of a graphical user interface for querying an instance of an ontology in accordance with the subject matter disclosed herein.

FIG. 7 illustrates one embodiment of a graphical user interface 700 for querying an instance of an ontology. The dictionary definition of ontology is "the branch of metaphysics dealing with the nature of being". Rather than being a database that stores a web of interconnected fields, an ontology has extra information which allows individual bits of the ontology to answer questions of "what do I do?", and "how do I do it?" for the things that are used in and around systems, such as digital twins. Rather than focusing time and attention on "what is this thing called?", the ontology focuses on more complex questions such as "how do things work quantitatively?" Within this ontology, objects within the ontology may be displayed in various ways. As shown, the system may include an environment 710, at least some aspect of which is modeled by a digital twin 720. The digital twin 720, in turn, interacts with a digital twin ontology graph explorer suite 730 for providing a user with various means for understanding the makeup of the digital twin 720 and, by doing so, being able to use the digital twin 720 for gaining insights into the real-world environment 710. According to one specific set of examples, the environment 710 is a portfolio of buildings while the digital twin 720 models various aspects of that portfolio as domains. The domains partition the database schema into related groupings, such as, for example, the people that use the building (people 775), the environment where the building is located 673, the building itself 752, equipment 774, such as the HVAC equipment need; all which may be characterized with different properties. In an embodiment view, the domains are listed 750 on the user interface. These domains may partition the digital twin ontology into related sections. Some or all of the digital ontology may be so partitioned. Some domains may be drilled down to more basic schema components, i.e., objects. For example, some of the objects that the Building 752 domain contains are shown below the building domain 752, from "Adjacency" to "Adjacency Type". The schema components may then be used to select specific data within an database instance, which may be a digital twin instance.

Figure 8:
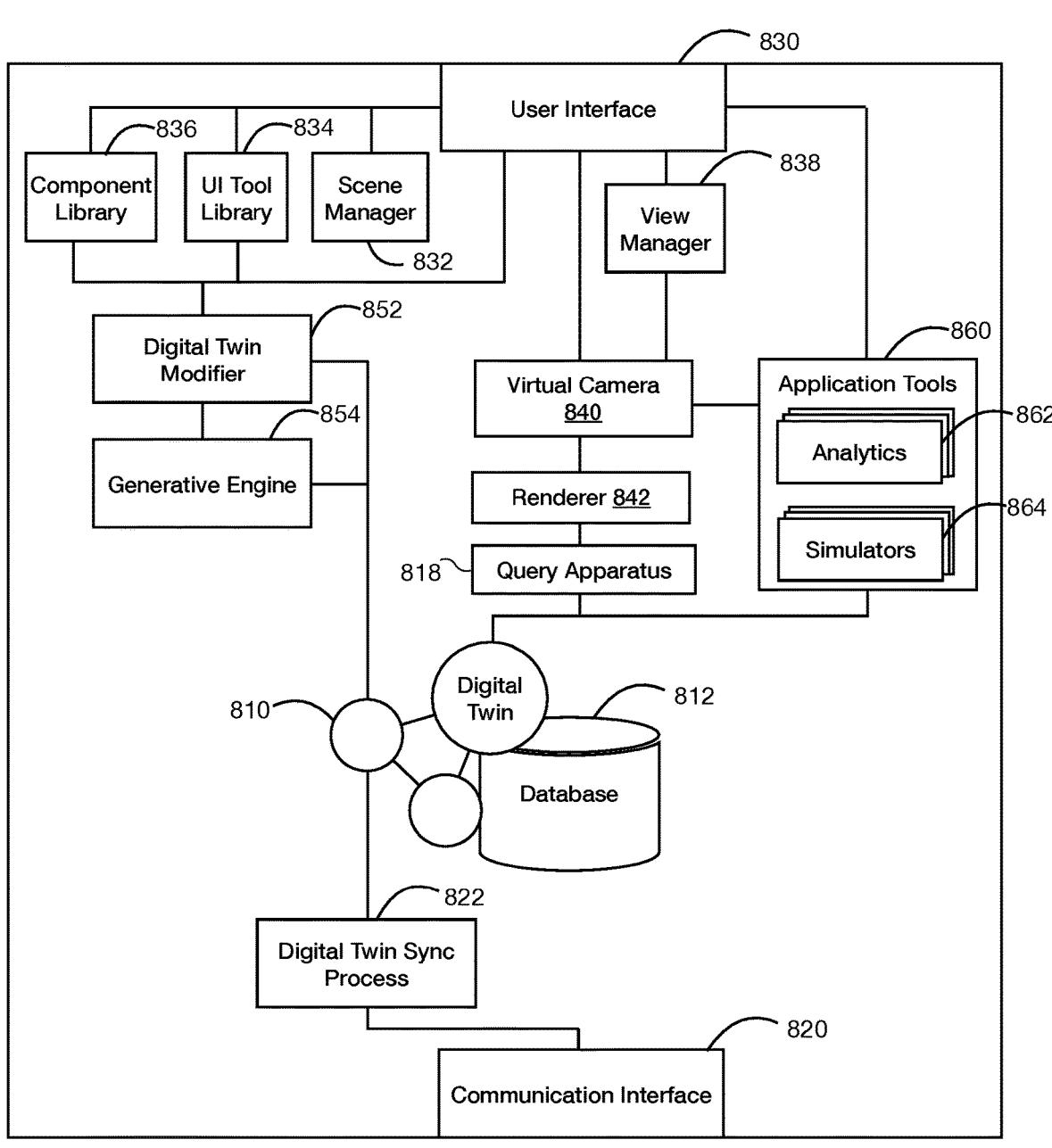
FIG. 8 is an example device for implementing a digital twin viewing and exploring suite in accordance with the subject matter disclosed herein.

FIG. 8 illustrates an example device for implementing a digital twin viewing and exploring suite 800. The digital twin application device 800 may correspond to the device that provides digital twin viewing and exploring suite 130a and, as such, may provide a user with access to one or more applications for interacting with a digital twin.

The digital twin application device 800 includes a digital twin 810, which may be stored in a database 212. This database may be stored as a schema. A database schema may be a blueprint or structural design that defines the organization, structure, and relationships of data within a database. It may provide a logical view of the entire database, describing how data is organized and how different data elements relate to each other. A database schema may include the following elements: tables, columns, constants, relationships, indexes, etc. Tables are used to store data in a database. Each table represents a specific entity or concept, such as buildings, floors, adjacency, etc. Tables are made up of rows (records) and columns (fields) to store individual pieces of data. Columns represent attributes or properties of the data stored in a table. Columns have a data type that defines the kind of data it can hold, such as text, numbers, dates, or binary data. Relationships: The schema defines how tables in the database are related to each other. Constraints may specify rules or conditions that data must meet to maintain data integrity. Common constraints include unique constraints (ensuring uniqueness of values in a column) and check constraints (specifying allowable values). Indexes: Indexes are used to optimize data retrieval by creating a data structure that allows a database management system to locate and access data in a table. Views may be virtual tables that provide a way to present data from one or more tables in a specific format without changing the underlying data. A query apparatus 818 may find a good path through the schema and write an efficient query. The query apparatus may also create a view that is then at least partially used by the renderer 842 to display the query itself or the query results.

The digital twin 810 may correspond to the digital twin 720 or a portion thereof (e.g., those portions relevant to the applications provided by the digital twin application device 800) The digital twin 810 may be used to drive or otherwise inform many of the applications provided by the digital twin application device 800. A digital twin 810 may be any data structure that models a real-life object, device, system, or other entity. Examples of a digital twin 810 useful for various embodiments will be described in greater detail below with reference to FIG. 9. While various embodiments will be described with reference to a particular set of heterogeneous and omnidirectional neural network digital twins, it will be apparent that the various techniques and embodiments described herein may be adapted to other types of digital twins. In some embodiments, additional systems, entities, devices, processes, or objects may be modeled and included as part of the digital twin 810.

In some embodiments, the digital twin 810 may be created and used entirely locally to the digital twin application device 800. In others, the digital twin may be made available to or from other devices via a communication interface 820. The communication interface 820 may include virtually any hardware for enabling connections with other devices, such as an Ethernet network interface card (NIC), WiFi NIC, or USB connection.

A digital twin sync process 822 may communicate with one or more other devices via the communication interface 820 to maintain the state of the digital twin 810. For example, where the digital twin application device 800 creates or modifies the digital twin 810 to be used by other devices, the digital twin sync process 822 may send the digital twin 810 or updates thereto to such other devices as the user changes the digital twin 810. Similarly, where the digital twin application device 800 uses a digital twin 810 created or modified by another device, the digital twin sync process 822 may request or otherwise receive the digital twin 810 or updates thereto from the other devices via the a communication interface 820, and commit such received data to the database 812 for use by the other components of the digital twin application device 800. In some embodiments, both of these scenarios simultaneously exist as multiple devices collaborate on creating, modifying, and using the digital twin across various applications. As such, the digital twin sync process 822 (and similar processes running on such other devices) may be responsible for ensuring that each device participating in such collaboration maintains a current copy of the digital twin, as presently modified by all other such devices. In various embodiments, this synchronization is accomplished via a pub/sub approach, wherein the digital twin sync process 822 subscribes to updates to the digital twin 822 and publishes its own updates to be received by similarly-subscribed devices. Such a pub/sub approach may be supported by a centralized process, such as a process running on a central server or central cloud instance.

To enable user interaction with the digital twin, the digital twin application device includes a user interface 830. For example, the user interface 830 may include a display, a touchscreen, a keyboard, a mouse, or any device capable of performing input or output functions for a user. In some embodiments, the user interface 830 may instead or additionally allow a user to use another device for such input or output functions, such as connecting a separate tablet, mobile phone, or other device for interacting with the digital twin application device 800. In some embodiments, the user interface 830 includes a web server that serves interfaces to a remote user's personal device (e.g., via the communications interface). Thus, in some embodiments, the applications provided by the digital twin application device 800 may be provided as a web-based software-as-a-service (SaaS) offering.

The user interface 830 may rely on multiple additional components for constructing one or more graphical user interfaces for interacting with the digital twin A scene manager 832 may store definitions of the various interface scenes that may be offered to the user. As used herein, an interface scene will be understood to encompass a collection of panels, tools, and other GUI elements for providing a user with a particular application (or set of applications). For example, four interface scenes may be defined, respectively for a building design application, a site analysis application, a simulation application, and a live building analysis application. It will be understood that various customizations and alternate views may be provided to a particular interface scene without constituting an entirely new interface scene. For example, panels may be rearranged, tools may be swapped in and out, and information displayed may change during operation without fundamentally changing the overall application provided to the user via that interface scene.

The UI tool library 834 stores definitions of the various tools that may be made available to the user via the user interface 830 and the various interface scenes (e.g., by way of a selectable interface button). These tool definitions in the UI tool library 834 may include software defining manners of interaction that add to, remove from, or modify aspects of the digital twin. As such, tools may include a user-facing component that enables interaction with aspects of the user interface scene, and a digital twin-facing component that captures the context of the user's interactions, and instructs the digital twin modifier 852 or generative engine 854 to make appropriate modifications to the digital twin 810. For example, a tool may be included in the UI tool library 834 that enables the user to create a zone. On the UI side, the tool enables the user to draw a square (or other shape) representing a new zone in a UI workspace. The tool then captures the dimensions of the zone and its position relative to the existing architecture, and passes this context to the digital twin modifier 852, so that a new zone can be added to the digital twin 810 with the appropriate position and dimensions.

A component library 836 stores definitions of various digital objects that may be made available to the user via the user interface 830 and the various interface scenes (e.g., by way of a selection of objects to drag-and-drop into a workspace). These digital objects may represent various real-world items such as devices (e.g., sensors, lighting, ventilation, user inputs, user indicators), landscaping, and other elements. The digital objects may include two different aspects: an avatar that will be used to graphically represent the digital object in the interface scene and an underlying digital twin that describes the digital object at an ontological or functional level. When the user indicates that a digital twin should be added to the workspace, the component library provides that object's digital twin to the digital twin modifier 852 so that it may be added to the digital twin 810.

A view manager 838 provides the user with controls for changing the view of the building rendering. For example, the view manager 838 may provide one or more interface controls to the user via the user interface to rotate, pan, or zoom the view of a rendered building; toggle between two-dimensional and three-dimensional renderings; or change which portions (e.g., floors) of the building are shown. In some embodiments, the view manager may also provide a selection of canned views from which the user may choose to automatically set the view to a particular state. The user's interactions with these controls are captured by the view manager 838 and passed on to the virtual cameras and the renderers 840, to inform the operation thereof.

The renderers 840 include a collection of libraries for generating the object representations that will be displayed via the user interface 830. In particular, where a current interface scene is specified by the scene manager 832 as including the output of a particular renderer 840, the user interface 830 may activate or otherwise retrieve image data from that renderer for display at the appropriate location on the screen.

Some renderers 840 may render the digital twin (or a portion thereof) in visual form. For example, a building renderer may translate the digital twin 810 into a visual depiction of one or more floors of the building it represents. The manner in which this is performed may be driven by the user via settings passed to the building renderer via the view manager. For example, depending on the user input, the building renderer may generate various domain views that include the objects in the domain, e.g., 742.

Some renderers 840 may maintain their own data for rendering visualizations. For example, in some embodiments, the digital twin 810 may not store sufficient information to drive a rendering of the site of a building. For example, rather than storing map, terrain, and architectures of surrounding buildings in the digital twin 810, a site renderer may obtain this information based on the specified location for the building. In such embodiments, the site renderer may obtain this information via the communication interface 820, generate intermediate description of the surrounding environment (e.g., descriptions of the shapes of other buildings in the vicinity of the subject building), and store this for later user (e.g., in the database 812, separate from the digital twin). Then, when the user interface 830 calls on the site renderer to provide a site rendering, the site renderer uses this intermediate information along with the view preferences provided by the view manager, to render a visualization of the site and surrounding context. In other embodiments where the digital twin 810 does store sufficient information for rendering the site (or where other digital twins are available to the digital twin application device with such information), the site renderer may render the site visualization based on the digital twin in a manner similar to the building renderer 840.

Some renderers 840 may produce visualizations based on information stored in the digital twin (as opposed to rendering the digital twin itself). For example, the digital twin 810 may store a temperature value associated with each zone. An overlay renderer may produce an overlay that displays the relevant temperature value over each zone rendered by the building renderer. Similarly, some renderers 840 may produce visualizations based on information provided by other components. For example, an application tool 860 may produce an interpolated gradient of temperature values across the zones and the overlay renderer may produce an overlay with a corresponding color-based gradient across the floors of each zone rendered by the building renderer.

The collaboration between virtual camera 842 and renderers 840 is fundamental in crafting the images destined for the user interface 230. Serving as a digital counterpart to a physical camera, the virtual camera defines critical attributes such as position, orientation, and field of view. It essentially becomes the "eye" through which the scene is observed, setting the stage for rendering by one or more renderers. The virtual camera assumes the role of determining the viewpoint and perspective for rendering, dictating which portion of the three-dimensional scene enters the frame. It also handles the selection of projection type, which can encompass perspectives, orthographics, or a fusion of both. Moreover, the virtual camera applies the appropriate projection matrix, effectively transforming the three-dimensional environment into a two-dimensional plane. Following this projection onto the two-dimensional plane, the renderer 840 takes over, rendering the flattened scene. In certain implementations, the virtual camera provides a transformation matrix used by the renderer 840 to accurately generate the final two-dimensional image.

As noted above, while various tools in the UI tool library 834 provide a user experience of interacting directly with the various renderings shown in the interface scene, these tools actually provide a means to manipulate the digital twin 810. These changes are then picked up by the renderers 840 and virtual camera 842 for display. To enable these changes to the digital twin, a digital twin modifier 852 provides a library for use by the UI tool library 834, user interface 830, component library 836 or other components of the digital twin application device 800. The digital twin modifier 852 may be capable of various modifications such as adding new nodes to the digital twin; removing nodes from the digital twin; modifying properties of nodes; adding, changing, or removing connections between nodes; or adding, modifying, or removing sets of nodes (e.g., as may be correlated to a digital object in the component library 836). In many instances, the user instructs the digital twin modifier 852 what changes to make to the digital twin 810 (via the user interface 830, UI tool library 834, or other component). For example, a tool for adding a zone, when used by the user, directly instructs the digital twin modifier to add a zone node and wall nodes surrounding it to the digital twin. As another example, where the user interface 830 provides a slider element for modifying an R-value of a wall, the user interface 830 will directly instruct the digital twin to find the node associated with the selected wall and change the R-value thereof.

In some cases, one or more contextual, constraint-based, or otherwise intelligent decisions are to be made in response to user input to determine how to modify the digital twin 810. These more complex modifications to the digital twin 810 may be handled by the generative engine 854. For example, when a new zone is drawn, the walls surrounding it may have difference characteristics depending on whether they should be interior or exterior walls. This decision, in turn, is informed by the context of the new zone in relation to other zones and walls. If the wall will be adjacent another zone, it should be interior; if not, it should be exterior. In this case, the generative engine 854 may be configured to recognize specific contexts and interpret them according to, e.g., a rule set to product the appropriate modifications to the digital twin 810.

As another example, in some embodiments, a tool may be provided to the user for generating structure or other object based on some constraint or other setting. For example, rather than using default or typical roof construction, the user may specify that the roof should be dome shaped. Then, when adding a zone to the digital twin, the generative engine may generate appropriate wall constructions and geometries, and any other needed supports, to provide a structurally-sound building. To provide this advanced functionality, the generative engine 854 may include libraries implementing various generative artificial intelligence techniques. For example, the generative engine 854 may add new nodes to the digital twin, create a cost function representing the desired constraints and certain tunable parameters relevant to fulfilling those constraints, and perform gradient descent to tune the parameters of the new nodes to provide a constraint (or other preference) solving solution.

Various interface scenes may provide access to additional application tools 860 beyond means for modifying the digital twin and displaying the results. As shown, some possible application tools include one or more analytics tools or simulators 864. The analytics tools 862 may provide advanced visualizations for showing the information captured in the digital twin 862. As in an earlier mentioned example, an analytics tool may interpolate temperatures across the entire footprint of a floorplan, so as to enable an overlay renderer (not shown) to provide an enhanced view of the temperature of the building compared to the point temperatures that may be stored in each node of the digital twin 210. In some embodiments, these analytics and associated overlay may be updated in real time. To realize such functionality, a separate building controller (not shown) may continually or periodically gather temperature data from various sensors deployed in the building. These updates to that building controller's digital twin may then be synchronized to the digital twin 810 (through operation of the digital twin sync process 822), which then drives updates to the analytics tool.

As another example, an analytics tool 862 may extract entity or object locations from the digital twin 810, so that an overlay renderer (not shown) can then render a live view of the movement of those entities or objects through the building. For example, where the building is a warehouse, inventory items may be provided with RFID tags and an RFID tracking system may continually update its version of the building digital twin with inventory locations. Then, as this digital twin is continually or periodically synced to the local digital twin 810, the object tracking analytics tool 862 may extract this information from the digital twin 862 to be rendered. In this way, the digital twin application device 200 may realize aspects of a live, operational BIM.

The application tools 860 may also include one or more simulators 864. As opposed to the analytics tools 862 which focus on providing informative visualizations of the building as it is, the simulator tools 864 may focus on predicting future states of the building or predicting current states of the building that are not otherwise captured in the digital twin 810. For example, a shadow simulator 864 may use the object models used by the site renderer to simulate shadows and sub exposure on the building rendering. This simulation information may be provided to the renderers 840 for rendering visualizations of this shadow coverage. As another example, an operation simulator 864 may simulate operations of the digital twin 810 into the future and provide information for the user interface 830 to display graphs of the simulated information. As one example, the operation simulator 864 may simulate the temperature of each zone of the digital twin for 7 days into the future. The associated interface scene may then drive the user interface to construct and display a line graph from this data so that the user can view and interact with the results. Various additional application tools 860, methods for integrating their results into the user interface 830, and methods for enabling them to interact with the digital twin 810 will be apparent.

Figure 9:
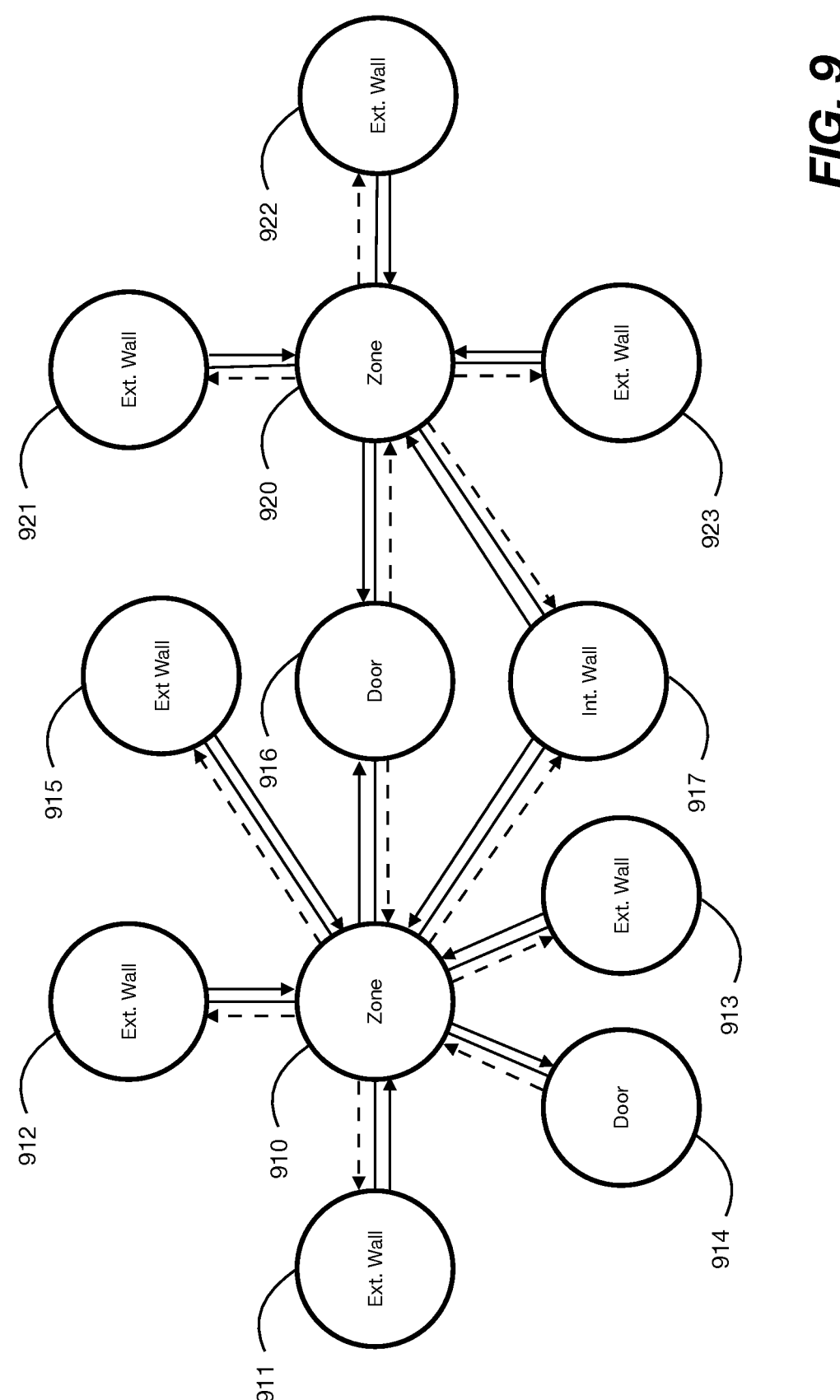
FIG. 9 is an example digital twin for construction by or use in various embodiments in accordance with the subject matter disclosed herein.

FIG. 9 illustrates an example digital twin 900 for construction by or use in various embodiments. The digital twin 900 may correspond, for example, to digital twin 720 or digital twin 810. As shown, the digital twin 900 includes a number of nodes 910, 911, 912, 913, 914, 915, 916, 920, 921, 922, 923 connected to each other via edges. As such, the digital twin 300 may be arranged as a graph, such as a neural network. In various alternative embodiments, other arrangements may be used. Further, while the digital twin may reside in storage as a graph type data structure, it will be understood that various alternative data structures may be used for the storage of a digital twin 900 as described herein. The nodes 910-923 may correspond to various aspects of a building structure such as zones, walls, and doors. The edges between the nodes 910-923 may, then, represent between the aspects represented by the nodes 910-923 such as, for example, adjacency for the purposes of heat transfer.

As shown, the digital twin 900 includes two nodes 910, 920 representing zones. A first zone node 310 is connected to four exterior wall nodes 911, 912, 913, 915; two door nodes 914, 916; and an interior wall node 917. A second zone node 920 is connected to three exterior wall nodes 921, 922, 923; a door node 916; and an interior wall node 917. The interior wall node 917 and door node 916 are connected to both zone nodes 910, 920, indicating that the corresponding structures divide the two zones. This digital twin 900 may thus correspond to a two-room structure.

It will be apparent that the example digital twin 900 may be, in some respects, a simplification. For example, the digital twin 900 may include additional nodes representing other aspects such as additional zones, windows, ceilings, foundations, roofs, or external forces such as the weather or a forecast thereof. It will also be apparent that in various embodiments the digital twin 900 may encompass alternative or additional systems such as controllable systems of equipment (e.g., HVAC systems).

According to various embodiments, the digital twin 900 is a heterogenous neural network. Typical neural networks are formed of multiple layers of neurons interconnected to each other, each starting with the same activation function. Through training, each neuron's activation function is weighted with learned coefficients such that, in concert, the neurons cooperate to perform a function. The example digital twin 900, on the other hand, may include a set of activation functions (shown as solid arrows) that are, even before any training or learning, differentiated from each other, i.e., heterogenous. In various embodiments, the activation functions may be assigned to the nodes 910-923 based on domain knowledge related to the system being modeled. For example, the activation functions may include appropriate heat transfer functions for simulating the propagation of heat through a physical environment (such as function describing the radiation of heat from or through a wall of particular material and dimensions to a zone of particular dimensions). As another example, activation functions may include functions for modeling the operation of an HVAC system at a mathematical level (e.g., modeling the flow of fluid through a hydronic heating system and the fluid's gathering and subsequent dissipation of heat energy). Such functions may be referred to as "behaviors" assigned to the nodes 910-923. In some embodiments, each of the activation functions may in fact include multiple separate functions; such an implementation may be useful when more than one aspect of a system may be modeled from node-to-node. For example, each of the activation functions may include a first activation function for modeling heat propagation and a second activation function for modeling humidity propagation. In some embodiments, these diverse activation functions along a single edge may be defined in opposite directions. For example, a heat propagation function may be defined from node 910 to node 911, while a humidity propagation function may be defined from node 911 to node 910. In some embodiments, the diversity of activation functions may differ from edge to edge. For example, one activation function may include only a heat propagation function, another activation function may include only a humidity propagation function, and yet another activation function may include both a heat propagation function and a humidity propagation function.

According to various embodiments, the digital twin 300 is an omnidirectional neural network. Typical neural networks are unidirectional—they include an input layer of neurons that activate one or more hidden layers of neurons, which then activate an output layer of neurons. In use, typical neural networks use a feed-forward algorithm where information only flows from input to output, and not in any other direction. Even in deep neural networks, where other paths including cycles may be used (as in a recurrent neural network), the paths through the neural network are defined and limited. The example digital twin 900, on the other hand, may include activation functions along both directions of each edge: the previously discussed "forward" activation functions (shown as solid arrows) as well as a set of "backward" activation functions (shown as dashed arrows).

In some embodiments, at least some of the backward activation functions may be defined in the same way as described for the forward activation functions—based on domain knowledge. For example, while physics-based functions can be used to model heat transfer from a surface (e.g., a wall) to a fluid volume (e.g., an HVAC zone), similar physics-based functions may be used to model heat transfer from the fluid volume to the surface. In some embodiments, some or all of the backward activation functions are derived using automatic differentiation techniques. Specifically, according to some embodiments, reverse mode automatic differentiation is used to compute the partial derivative of a forward activation function in the reverse direction. This partial derivative may then be used to traverse the graph in the opposite direction of that forward activation function. Thus, for example, while the forward activation function from node 911 to node 910 may be defined based on domain knowledge and allow traversal (e.g., state propagation as part of a simulation) from node 911 to node 910 in linear space, the reverse activation function may be defined as a partial derivative computed from that forward activation function and may allow traversal from node 910 to 911 in the derivative space. In this manner, traversal from any one node to any other node is enabled—for example, the graph may be traversed (e.g. state may be propagated) from node 912 to node 913, first through a forward activation function, through node 910, then through a backward activation function. By forming the digital twin as an omnidirectional neural network, its utility is greatly expanded; rather than being tuned for one particular task, it can be traversed in any direction to simulate different system behaviors of interest and may be "asked" many different questions.

According to various embodiments, the digital twin is an ontologically labeled neural network. In typical neural networks, individual neurons do not represent anything in particular; they simply form the mathematical sequence of functions that will be used (after training) to answer a particular question. Further, while in deep neural networks, neurons are grouped together to provide higher functionality (e.g. recurrent neural networks and convolutional neural networks), these groupings do not represent anything other than the specific functions they perform; i.e., they remain simply a sequence of operations to be performed.

The example digital twin 900, on the other hand, may ascribe meaning to each of the nodes 910-923 and edges therebetween by way of an ontology. For example, the ontology may define each of the concepts relevant to a particular system being modeled by the digital twin 900 such that each node or connection can be labeled according to its meaning, purpose, or role in the system. In some embodiments, the ontology may be specific to the application (e.g., including specific entries for each of the various HVAC equipment, sensors, and building structures to be modeled), while in others, the ontology may be generalized in some respects. For example, rather than defining specific equipment, the ontology may define generalized "actors" (e.g., the ontology may define producer, consumer, transformer, and other actors for ascribing to nodes) that operate on "quanta" (e.g., the ontology may define fluid, thermal, mechanical, and other quanta for propagation through the model) passing through the system. Additional aspects of the ontology may allow for definition of behaviors and properties for the actors and quanta that serve to account for the relevant specifics of the object or entity being modeled. For example, through the assignment of behaviors and properties, the functional difference between one "transport" actor and another "transport" actor can be captured.

The above techniques, alone or in combination, may enable a fully-featured and robust digital twin 900, suitable for many purposes including system simulation and control path finding. The digital twin 900 may be computable and trainable like a neural network, queryable like a database, introspectable like a semantic graph, and callable like an API.

As described above, the digital twin 900 may be traversed in any direction by application of activation functions along each edge. Thus, just like a typical feedforward neural network, information can be propagated from input node(s) to output node(s). The difference is that the input and output nodes may be specifically selected on the digital twin 900 based on the question being asked, and may differ from question to question. In some embodiments, the computation may occur iteratively over a sequence of timesteps to simulate over a period of time. For example, the digital twin 300 and activation functions may be set at a particular timestep (e.g., 1 minute), such that each propagation of state simulates the changes that occur over that period of time. Thus, to simulate longer period of time or point in time further in the future (e.g., one minute), the same computation may be performed until a number of timesteps equaling the period of time have been simulated (e.g., 60 one second time steps to simulate a full minute). The relevant state over time may be captured after each iteration to produce a value curve (e.g., the predicted temperature curve at node 910 over the course of a minute) or a single value may be read after the iteration is complete (e.g., the predicted temperature at node 910 after a minute has passed). The digital twin 900 may also be inferenceable by, for example, attaching additional nodes at particular locations such that they obtain information during computation that can then be read as output (or as an intermediate value as described below).

While the forward activation functions may be initially set based on domain knowledge, in some embodiments training data along with a training algorithm may be used to further tune the forward activation functions or the backward activation functions to better model the real world systems represented (e.g., to account for unanticipated deviations from the plans such as gaps in venting or variance in equipment efficiency) or adapt to changes in the real world system over time (e.g., to account for equipment degradation, replacement of equipment, remodeling, opening a window, etc.).

Training may occur before active deployment of the digital twin 900 (e.g., in a lab setting based on a generic training data set) or as a learning process when the digital twin 900 has been deployed for the system it will model. To create training data for active-deployment learning, a controller device (not shown) may observe the data made available from the real-world system being modeled (e.g., as may be provided by a sensor system deployed in the environment 710) and log this information as a ground truth for use in training examples. To train the digital twin 900, that controller may use any of various optimization or supervised learning techniques, such as a gradient descent algorithm that tunes coefficients associated with the forward activation functions or the backward activation functions. The training may occur from time to time, on a scheduled basis, after gathering of a set of new training data of a particular size, in response to determining that one or more nodes or the entire system is not performing adequately (e.g., an error associated with one or more nodes 910-923 passed a threshold or passes that threshold for a particular duration of time), in response to manual request from a user, or based on any other trigger. In this way, the digital twin may be adapted to better adapt its operation to the real world operation of the systems it models, both initially and over the lifetime of its deployment, by tacking itself to the observed operation of those systems.

The digital twin 900 may be introspectable. That is, the state, behaviors, and properties of the nodes 910-923 may be read by another program or a user. This functionality is facilitated by association of each node 910-923 to an aspect of the system being modeled. Unlike typical neural networks where, due to the fact that neurons don't represent anything particularly the internal values are largely meaningless (or perhaps exceedingly difficult or impossible to ascribe human meaning), the internal values of the nodes 910-923 can easily be interpreted. If an internal "temperature" property is read from node 910, it can be interpreted as the anticipated temperature of the system aspect associated with that node 910.

Through attachment of a semantic ontology, as described above, the introspectability can be extended to make the digital twin 300 queryable. That is, ontology can be used as a query language usable to specify what information is desired to be read from the digital twin 900. For example, a query may be constructed to "read all temperatures from zones having a volume larger than 200 square feet and an occupancy of at least 1." A process for querying the digital twin 900 may then be able to locate all nodes 910-923 representing zones that have properties matching the volume and occupancy criteria, and then read out the temperature properties of each. Such queries are discussed with reference to FIGS. 4A-6. The digital twin 900 may then additionally be callable like an API through such processes. With the ability to query and inference, canned transactions can be generated and made available to other processes that aren't designed to be familiar with the inner workings of the digital twin 900. For example, an "average zone temperature" API function could be defined and made available for other elements of the controller or even external devices to make use of. In some embodiments, further transformation of the data could be baked into such canned functions. For example, in some embodiments, the digital twin 900 itself may not itself keep track of a "comfort" value, which may be defined using various approaches such as the Fanger thermal comfort model. Instead, e.g., a "zone comfort" API function may be defined that extracts the relevant properties (such as temperature and humidity) from a specified zone node, computes the comfort according to the desired equation, and provides the response to the calling process or entity.

It will be appreciated that the digital twin 900 is merely an example of a possible embodiment and that many variations may be employed. In some embodiments, the number and arrangements of the nodes 910-923 and edges therebetween may be different, either based on the controller implementation or based on the system being modeled by each deployment of the controller. For example, a controller deployed in one building may have a digital twin 900 organized one way to reflect that building and its systems while a controller deployed in a different building may have a digital twin 900 organized in an entirely different way because the building and its systems are different from the first building and therefore dictate a different model. Further, various embodiments of the techniques described herein may use alternative types of digital twins. For example, in some embodiments, the digital twin 900 may not be organized as a neural network and may, instead, be arranged as another type of model for one or more components of the environment 710. In some such embodiments, the digital twin may be a database or other data structure that simply stores descriptions of the a system aspects, environmental features, or devices being modeled, such that other software has access to data representative of the real world objects and entities, or their respective arrangements, as the software performs its function.

While various embodiments disclosed herein will be described in the context of an building application or in the context of building design and analysis, it will be apparent that the techniques described herein may be applied to other applications including, for example, applications for controlling a lighting system, a security system, an automated irrigation or other agricultural system, a power distribution system, a manufacturing or other industrial system, or virtually any other system that may be controlled. Further, the techniques and embodiments may be applied to other applications outside the context of controlled systems or environments 710. These controlled systems or environments 710 may be buildings or portfolios of buildings. Virtually any entity or object that may be modeled by a digital twin may benefit from the techniques disclosed herein. Various modifications to adapt the teachings and embodiments to use in such other applications will be apparent.

The digital twin 720 is a digital representation of one or more aspects of the environment 610. In various embodiments, the digital twin 720 is implemented as a heterogenous, omnidirectional neural network. As such, the digital twin 720 may provide more than a mere description of the environment 710 and rather may additionally be trainable, computable, queryable, and inferencable, as will be described in greater detail below. In some embodiments, one or more processes continually, periodically, or on some other iterative basis adapts the digital twin 720 to better match observations from the environment 610. For example, the environment 710 may be outfitted with one or more temperature sensors that provide data to a building controller (not shown), which then uses this information to train the digital twin to better reflect the current state or operation of the environment. In this way, the digital twin is a "living" digital twin that, even after initial creation, continues to adapt itself to match the environment 110a, including adapting to changes such as system degradation or changes (e.g., permanent changes such as removing a wall and transient changes such as opening a window).

Various embodiments of the techniques described herein may use alternative types of digital twins than the heterogenous neural network type described in most examples herein. For example, in some embodiments, the digital twin 720 may not be organized as a neural network and may, instead, be arranged as another type of model for one or more components of the environment 610. In some such embodiments, the digital twin 720 may be a database or other data structure that simply stores descriptions of the system aspects, environmental features, or devices being modeled, such that other software has access to data representative of the real world objects and entities, or their respective arrangements, as the software performs its functions.

The digital twin ontology graph viewing and querying suite 730 (also referred to as the viewing and querying suite) may be a visual representation of the ontology of the digital twin showing domains, objects within the domains, and relationships between the different domains, between the objects within the same domain and different domains, etc. This suite also allows creating queries using visual elements within the suite 760. For clarity, not all text is shown within the displayed digital twin ontology graph viewing and querying suite 730. This viewing and querying suite may provide a collection of tools for interacting with the digital twin 720 such as, for example, tools for understanding the ontology that makes up the digital twin. The ontology is based on the previously mentioned domains and objects and the relationships between them, where the objects have attributes, all of which may be viewed. Viewing the schema allows for a much better understanding of the digital twin and makes It will be understood that while the explorer suite 730 is depicted here as a single user interface that the explorer suite 730 includes a mix of hardware and software, including software for performing various backend functions and for providing multiple different interface scenes (such as the one shown) for enabling the user to view representations of the digital twin 720. As shown, the d viewing and querying suite 730 provides a visual representation of the ontology of the digital twin showing domains, objects, and their relationships. This visual representation ontology may be used for various purposes such as for understanding the structure of the digital twin that has been created or is in the process of being created. It may also be used as a learning tool to more fully understand how to structure a query for an instance of a digital twin 720, or to structure a powerful query using a digital twin instance.

As shown, the digital twin exploring and querying suite 730 currently displays a list of ontology domains on left panel 750. The digital twin viewing and querying suite's current interface scene 740 includes a visual closeup of the building domain ontology using icons (in the instant case, hexagons) to represent objects within the domain. Arranged with reference to the building domain ontology are some of the objects associated with the building domain 742, along with lines indicating connections between the objects. Different embodiments may include different objects displayed as the equipment domain ontology 742. Various alternative embodiments will include a different set of panels or other overall graphical interface designs that enable access to the applications, tools, and techniques described herein.

Figure 10:
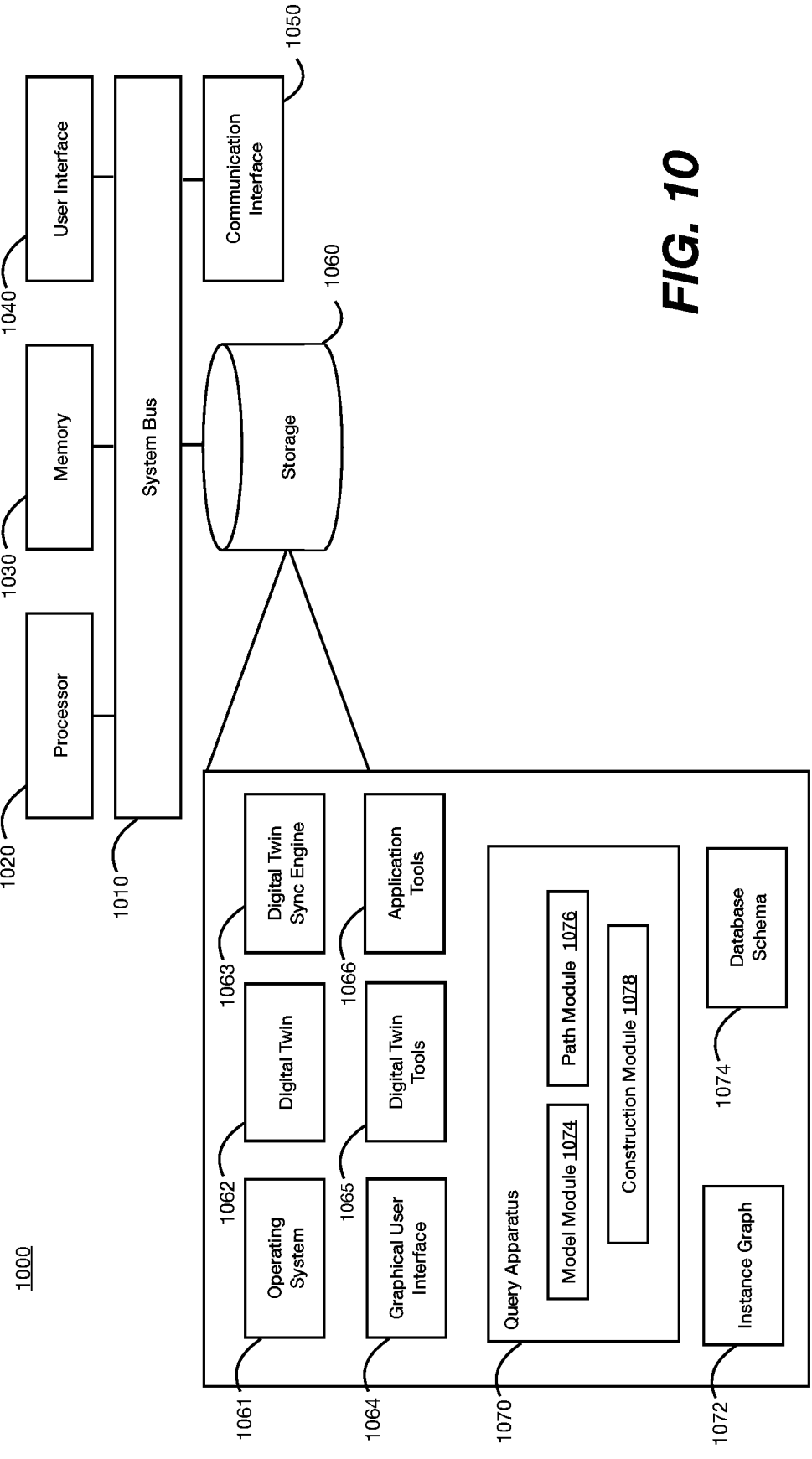
FIG. 10 is an example hardware device for implementing query constructions in accordance with the subject matter disclosed herein.

FIG. 10 illustrates an example hardware device 1000 for implementing a digital twin application device. The hardware device 1000 may describe the hardware architecture and some stored software of a device providing a digital twin viewing and exploring suite 730 or the digital twin application device 800. As shown, the device 1000 includes a processor 1020, memory 1030, user interface 1040, communication interface 1050, and storage 1060 interconnected via one or more system buses 1010. It will be understood that FIG. 10 constitutes, in some respects, an abstraction and that the actual organization of the components of the device 1000 may be more complex than illustrated.

The processor 1020 may be any hardware device capable of executing instructions stored in memory 1030 or storage 1060 or otherwise processing data. As such, the processor 1020 may include a microprocessor, field programmable gate array (FPGA), application-specific integrated circuit (ASIC), or other similar devices. The memory 1030 may include various memories such as, for example L1, L2, or L3 cache or system memory. As such, the memory 1030 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1040 may include one or more devices for enabling communication with a user such as an administrator. For example, the user interface 1040 may include a display, a mouse, a keyboard for receiving user commands, or a touchscreen. In some embodiments, the user interface 1040 may include a command line interface or graphical user interface that may be presented to a remote terminal via the communication interface 1750 (e.g., as a website served via a web server).

The communication interface 1050 may include one or more devices for enabling communication with other hardware devices. For example, the communication interface 1050 may include a network interface card (NIC) configured to communicate according to the Ethernet protocol. Additionally, the communication interface 1050 may implement a TCP/IP stack for communication according to the TCP/IP protocols. Various alternative or additional hardware or configurations for the communication interface 1050 will be apparent.

The storage 1060 may include one or more machine-readable storage media such as read-only memory (ROM), random-access memory (RAM), magnetic disk storage media, optical storage media, flash-memory devices, or similar storage media. In various embodiments, the storage 1060 may store instructions for execution by the processor 1020 or data upon with the processor 1020 may operate. For example, the storage 1060 may store a base operating system 1061 for controlling various basic operations of the hardware 1000.

The storage 1060 additionally includes a digital twin 1062, such as a digital twin according to any of the embodiments described herein. As such, in various embodiments, the digital twin 1062 includes a heterogeneous and omnidirectional neural network. A digital twin sync engine 1063 may communicate with other devices via the communication interface 1050 to maintain the local digital twin 1062 in a synchronized state with digital twins maintained by such other devices. Graphical user interface instructions 1064 may include instructions for rendering the various user interface elements for providing the user with access to various applications. As such, the GUI instructions 1064 may correspond to one or more of the scene manager 832, UI tool library 834, component library 836, view manager 838, user interface 830, or portions thereof. Digital twin tools 1065 may provide various functionality for modifying the digital twin 1062 and, as such, may correspond to the digital twin modifier 852 or generative engine 854. Application tools 1066 may include various libraries for performing functionality for interacting with the digital twin 1062, such as computing advanced analytics from the digital twin 1062 and performing simulations using the digital twin 1062. As such, the application tools 1066 may correspond to the application tools 860.

The storage 1060 may also include one or more query apparatuses 1070. These query apparatuses may include a model module 1074. This model module may correspond to Model Module 202. A path module 1076 may be included that corresponds to a path module 204. A construction module 1076 may also be included. This construction module may correspond to a construction module 206.

An instance graph 1072 is the data associated with a specific set of objects that make up a digital twin. More specifically, a database instance may be a specific, operational, and independent copy of a database system, including its associated data and the database management software. This instance graph 1072 may be stored using a database schema 1074. Some embodiments may have multiple digital twin instance graphs, all stored using the database schema. Using the schema, users may view data within a specific instance graph. This data may be viewed within a view of the digital twin schema.

While the hardware device 1000 is shown as including one of each described component, the various components may be duplicated in various embodiments. For example, the processor 1020 may include multiple microprocessors that are configured to independently execute the methods described herein or are configured to perform steps or subroutines of the methods described herein such that the multiple processors cooperate to achieve the functionality described herein, such as in the case where the device 1000 participates in a distributed processing architecture with other devices which may be similar to device 1000. Further, where the device 1000 is implemented in a cloud computing system, the various hardware components may belong to separate physical systems. For example, the processor 1020 may include a first processor in a first server and a second processor in a second server.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory that stores code executable by the processor to:
   receive a starting model associated with a digital twin graph schema defining a digital twin graph, the starting model represented on a user interface as a graphical icon;
   receive an ending model associated with the digital twin graph schema, the ending model represented on the user interface as a graphical icon;
   determine an optimal path through the digital twin graph schema from the starting model to the ending model creating a determined optimal path;

construct a query for querying the digital twin graph based on the determined optimal path creating a constructed query;
   execute the constructed query on the digital twin graph producing an executed query; and
   present a textual representation of results of the executed query on the user interface.

2. The apparatus of claim 1, wherein the code is executable by the processor to present the results of the executed query as a graph structure.

3. The apparatus of claim 1, wherein the code is executable by the processor to receive at least one filter model for setting a condition for the determined optimal path.

4. The apparatus of claim 1, wherein the code is executable by the processor to present an interactive graphical interface for displaying potential models, receiving the starting model, the ending model, and at least one optional filter model.

5. The apparatus of claim 4, wherein the code is executable by the processor to present a plurality of models associated with the digital twin graph schema and receive a selection of the starting model, the ending model, and the at least one optional filter model in response to user input.

6. The apparatus of claim 5, wherein the user input comprises a drag-and-drop action.

7. The apparatus of claim 5, wherein the code is executable by the processor to receive a user-defined value for the at least one optional filter model via the interactive graphical interface.

8. The apparatus of claim 4, wherein the code is executable by the processor to present the constructed query within the interactive graphical interface and results of the constructed query as executed on the digital twin graph.

9. The apparatus of claim 4, wherein the code is executable by the processor to, in response to a plurality of filter models being selected, receive a selection of at least one Boolean operator to apply to at least two of the selected filter models.

10. The apparatus of claim 1, wherein the code is executable by the processor to perform a breadth-first search to determine the optimal path through the digital twin graph schema from the starting model to the ending model.

11. The apparatus of claim 10, wherein the code is executable by the processor to determine the optimal path based on weights associated with models defined in the digital twin graph schema.

12. The apparatus of claim 1, wherein the code is executable by the processor to determine the optimal path based on inferences determined according to the starting model, the ending model, at least one optional filter model, user input, or a combination thereof.

13. The apparatus of claim 1, wherein the code is executable by the processor to determine a plurality of paths through the digital twin graph schema from the starting model to the ending model and to select the optimal path from the plurality of paths.

14. The apparatus of claim 13, wherein the optimal path comprises a shortest path from the starting model to the ending model.

15. The apparatus of claim 1, wherein the code is executable by the processor to determine the optimal path and construct the query in real-time in response to updates associated with the starting model, the ending model, at least one optional filter model, user input, or a combination thereof.

16. The apparatus of claim 1, wherein the digital twin graph schema is associated with a building ontology, the building ontology defining different elements of a building system.

17. A method, comprising:

receiving a starting model associated with a digital twin graph schema defining a digital twin graph, the starting model represented on a user interface as a graphical icon;

receiving an ending model associated with the digital twin graph schema, the ending model represented on a user interface as a graphical icon;

determining an optimal path through the digital twin graph schema from the starting model to the ending model creating a determined optimal path;

constructing a query for querying the digital twin graph based on the determined optimal path, creating a constructed query;

executing the constructed query on the digital twin graph, producing an executed query; and presenting a textual representation of results of the executed query on the user interface.

18. The method of claim 17, wherein the digital twin graph schema is associated with a building ontology, the building ontology defining different elements of a building system.

19. The method of claim 17, further comprising determining the optimal path based on inferences determined according to the starting model, the ending model, at least one optional filter model, user input, or a combination thereof.

20. A non-transitory computer-readable storage medium configured with data and instructions which upon execution by a processor perform a method comprising:

receiving a starting model associated with a digital twin graph schema defining a digital twin graph, the starting model represented on a user interface as a graphical icon;

receiving an ending model associated with the digital twin graph schema, the ending model represented on a user interface as a graphical icon;

determining an optimal path through the digital twin graph schema from the starting model to the ending model creating a determined optimal path;

constructing a query for querying the digital twin graph based on the determined optimal path, creating a constructed query;

executing the constructed query on the digital twin graph, producing an executed query; and presenting a textual representation of results of the executed query on the user interface.

\* \* \* \* \*